(12) United States Patent
Van Heerden et al.

(10) Patent No.: US 7,441,688 B2
(45) Date of Patent: Oct. 28, 2008

(54) METHODS AND DEVICE FOR CONTROLLING PRESSURE IN REACTIVE MULTILAYER JOINING AND RESULTING PRODUCT

(75) Inventors: David Van Heerden, Baltimore, MD (US); Jesse Newson, Timonium, MD (US); Timothy Rude, Timonium, MD (US); Omar M. Knio, Timonium, MD (US); Timothy P. Weihs, Baltimore, MD (US)

(73) Assignee: Reactive Nanotechnologies, Hunt Valley, MD (US)

( * ) Notice: Subject to any disclaimer, the term of this patent is extended or adjusted under 35 U.S.C. 154(b) by 195 days.

(21) Appl. No.: 10/976,877

(22) Filed: Nov. 1, 2004

(65) Prior Publication Data

US 2005/0121499 A1    Jun. 9, 2005

Related U.S. Application Data

(60) Provisional application No. 60/516,755, filed on Nov. 4, 2003.

(51) Int. Cl.
*B23K 31/02* (2006.01)
(52) U.S. Cl. .................... 228/102; 228/234.1; 228/246
(58) Field of Classification Search .................. 228/246
See application file for complete search history.

(56) References Cited

U.S. PATENT DOCUMENTS

| 3,158,927 A | 12/1964 | Saunders |
| 4,092,234 A * | 5/1978 | Horst et al. ............ 204/297.05 |
| 4,607,779 A | 8/1986 | Burns et al. |
| 4,715,526 A | 12/1987 | MacNeil et al. |
| 5,038,996 A | 8/1991 | Wilcox et al. |
| 5,175,410 A | 12/1992 | Freedman et al. |
| 5,381,944 A | 1/1995 | Makowiecki et al. |
| 5,477,009 A | 12/1995 | Brendecke et al. |
| 5,538,795 A | 7/1996 | Barbee, Jr. et al. |
| 5,547,715 A | 8/1996 | Barbee, Jr. et al. |
| 5,956,576 A | 9/1999 | Toy et al. |
| 6,216,937 B1 * | 4/2001 | DeLaurentis et al. .......... 228/13 |
| 6,413,800 B1 | 7/2002 | Kyle |

(Continued)

FOREIGN PATENT DOCUMENTS

EP    0 907 064 A2    4/1999

(Continued)

OTHER PUBLICATIONS

U.S. Appl. No. 10/959,502, Van Heerden et al.

(Continued)

*Primary Examiner*—Kiley Stoner
(74) *Attorney, Agent, or Firm*—Finnegan, Henderson, Farabow, Garrett, & Dunner, L.L.P.

(57) ABSTRACT

The invention includes a method of joining two components. The method includes providing at least two components to be joined, a reactive multilayer foil, and a compliant element, placing the reactive multilayer foil between the at least two components, applying pressure on the two components in contact with the reactive multilayer foil via a compliant element, and initiating a chemical transformation of the reactive multilayer foil so as to physically join the at least two components. The invention also includes two components joined using the aforementioned method.

15 Claims, 12 Drawing Sheets

U.S. PATENT DOCUMENTS

| | | | |
|---|---|---|---|
| 6,471,110 B1 * | 10/2002 | Luechinger et al. | 228/102 |
| 6,534,194 B2 | 3/2003 | Weihs et al. | |
| 6,616,031 B2 * | 9/2003 | Wong et al. | 228/102 |
| 6,708,862 B2 * | 3/2004 | Fujii et al. | 228/6.2 |
| 6,736,942 B2 | 5/2004 | Weihs et al. | |
| 2001/0038029 A1 | 11/2001 | Weihs et al. | |
| 2001/0046957 A1 | 11/2001 | Weihs et al. | |
| 2002/0179921 A1 | 12/2002 | Cohn | |
| 2002/0182436 A1 | 12/2002 | Weihs et al. | |
| 2003/0077474 A1 | 4/2003 | Rabinkin et al. | |
| 2003/0164289 A1 | 9/2003 | Weihs et al. | |

FOREIGN PATENT DOCUMENTS

| | | |
|---|---|---|
| JP | S57-102029 A | 9/1982 |
| JP | 04-304930 | 10/1992 |
| JP | 2000/323593 | 11/2000 |
| JP | 2001-202839 | 7/2001 |
| JP | 2003-531758 | 10/2003 |

OTHER PUBLICATIONS

U.S. Appl. No. 10/843,352, Besnoin et al.
U.S. Appl. No. 10/814,243, Van Heerden et al.
U.S. Appl. No. 10/247,998, Weihs et al.
U.S. Appl. No. 10/761,439, Weihs et al.
U.S. Appl. No. 10/761,440, Weihs et al.
U.S. Appl. No. 10/761,442, Weihs et al.
U.S. Appl. No. 10/761,443, Weihs et al.
U.S. Appl. No. 10/761,444, Weihs et al.
U.S. Appl. No. 10/761,685, Weihs et al.
U.S. Appl. No. 10/761,688, Weihs et al.
International Search Report and Written Opinion mailed Mar. 31, 2005 in corresponding International Patent Application No. PCT/US2004/036490, filed Nov. 3, 2004.
K.J. Blobaum, M.E. Reiss, J.M. Plitzko Lawrence, and T.P. Weihs; "Deposition and Characterization of a Self-Propagating CuOx/Al Thermite Reaction in a Multilayer Foil Geometry"; Journal of Applied Physics; Sep. 1, 2003; pp. 2915-2922; vol. 94, No. 5.
E. Besnoin, S. Cerutti, O.M. Knio, and T.P.Weihs; "Effect of Reactant and Product Melting on Self-Propagating Reactions in Multilayer Foils"; Journal of Applied Physics; Nov. 1, 2002; pp. 5474-5480; vol. 92, No. 9.
T.P. Weihs; "Self-Propagating Reactions in Multilayer Materials," published in the 1998 edition of the *Handbook of Thin Films Process Technology* edited by D.A. Glocker and S.I. Shah; 1998; 7 pages.
T.P. Weihs, A.J. Gavens, M.E. Reiss, D. Van Heerden, A. Draffan, and D. Stanfield; "Self-Propagating Exothermic Reactions in Nanoscale Multilayer Materials"; TMS Proceedings on Nanostructures; Feb. 1997; pp. 1-12.
"Technique for Obtaining an Environmentally Secure Adhesive Seal"; IBM Technical Disclosure Bulletin; Dec. 1986; pp. 3085-3087; vol. 29, No. 7; XP002025799; ISSN: 0018-8689; IBM Corp.; New York, US.
S. Jayaraman, O.M. Knio, A.B. Mann, and T.P. Weihs; "Numerical Predictions of Oscillatory Combustion in Reactive Multilayers"; Journal of Applied Physics; Jul. 15, 1999; pp. 800-809; vol. 86, No. 2.

D. Josell, A. Cezairliyan, D. Van Heerden, and B.T. Murray; "Thermal Diffusion Through Multilayer Coatings: Theory and Experiment"; NanoStructured Materials; 1997; pp. 727-736; vol. 9.
S. Jayaraman, A.B. Mann, O.M. Knio, D. Van Heerden, G. Bao, and T.P. Weihs; "Modeling Self-Propagating Exothermic Reactions In Multilayer Systems"; Materials Research Society Symposium Proceedings; 1998; pp. 563-568; vol. 481.
K.J. Blobaum, D. Van Heerden, A.J. Gavens, and T.P. Weihs; "Al/Ni Formation Reactions: Characterization of the Metastable $Al_9Ni_2$ Phase and Analysis of Its Formation"; Acta Materialia; 2003; pp. 3871-3884; vol. 51, No. 13.
A.J. Swiston, Jr., T.C. Hufnagel, and T.P. Weihs; Joining Bulk Metallic Glass Using Reactive Multilayer Foils; Scripta Materialia; 2003; pp. 1575-1580; vol. 48.
U. Anselmi-Tamburini and Z.A. Munir; "The Propagation of a Solid-State Combustion Wave in Ni-Al Foils"; Journal of Applied Physics; Nov. 15, 1989; pp. 5039-5045; vol. 66, No. 10.
A.J. Gavens, D. Van Heerden, A.B. Mann, M.E. Reiss, and T.P. Weihs; "Effect of Intermixing on Self-Propagating Exothermic Reactions in Al/Ni Nanolaminate Foils"; Journal of Applied Physics; Feb. 1, 2000; pp. 1255-1263; vol. 87, No. 3.
Office Action issued by the Japanese Patent Office on Jan. 7, 2008, for corresponding Japanese Patent Application No. 2006-538440.
T.S. Dyer and Z.A. Munir; "The Combustion Synthesis of Multilayer NiAl Systems"; Scripta Metallurgica et Materialia; 1994; pp. 1281-1286; vol. 30, No. 10.
D. Van Heerden, T.R. Rude, J. Newson, J. He, E. Besnoin, O.M. Knio, and T.P. Weihs; "A Tenfold Reduction in Interface Thermal Resistance for Heat Sink Mounting"; IMAPS Sumposium; 2003.
D. Van Heerden, A.J. Gavens, S. Jayaraman, and T.P. Weihs; "Metastable Phase Formation and Microstructural Evolution During Self-Propagating Reactions in Al/Ni and Al/Monel Multilayers"; Material Research Society Symposium Proceedings; Fall 1997; pp. 533-538; vol. 481.
M.E. Reiss, C.M. Esber, D. Van Heerden, A.J. Gavens, M.E. Williams, T.P. Weihs; "Self-propagating Formation Reactions in Nb/Si Multilayers"; Materials Science and Engineering; 1999; pp. 217-222; vol. A261.
Jayaraman S et al: "A numerical study of unsteady self-propagating reactions in multilayer foils" Twenty-Seventh Symposium (International) on Combustion/The Combustion Institute, vol. 27, 1998, pp. 2459-2467, XP008053034.
Feng A et al: "Modeling solution for electric field-activated combustion synthesis" Computational Materials Science Elsevier Netherlands, vol. 12, No. 2, Sep. 1998, pp. 137-155, XP002347465 ISSN: 0927-0256.
Munir Z A: "Field effects in self-propagating solid-state synthesis reactions" Solid State Ionics, North Holland Pub. Company. Amsterdam, NL, vol. 101-103, No. 2002, Nov. 1997, pp. 991-1001, XP004103681 ISSN: 0167-2738.
Locci A M et al: "Modeling of self-propagating reactions: past approaches and future directions" International Journal of Self-Propagating High-Temperature Synthesis Allerton Press USA, vol. 12, No. 2, Jun. 2003, pp. 61-90, XP008053029 ISSN: 1061-3862.

* cited by examiner

METHODS AND DEVICE FOR CONTROLLING PRESSURE IN REACTIVE MULTILAYER JOINING AND RESULTING PRODUCT

CROSS-REFERENCE TO RELATED APPLICATIONS

This application claims the benefits of priority under 35 U.S.C. § 119(e) to U.S. Provisional Patent Application No. 60/516,755, filed Nov. 4, 2003, the entirety of which is incorporated herein by reference.

STATEMENT REGARDING FEDERALLY SPONSORED RESEARCH

This invention was made with U.S. Government support under National Science Foundation Award Nos. DMI-0321500. The U.S. Government has certain rights in this invention.

DESCRIPTION OF THE INVENTION

1. Field of the Invention

The invention includes joining two components using a reactive multilayer foil by placing the two components in contact with the reactive multilayer foil using a compliant element.

2. Background of the Invention

Reactive multilayer joining is a particularly advantageous process for soldering, welding or brazing materials at room temperature. Examples of such joining are disclosed in the following, the entirety of all of which are incorporated herein by reference: U.S. Pat. No. 5,381,944; U.S. Provisional Patent Application No. 60/469,841, filed May 13, 2003; U.S. patent application Ser. No. 10/898,650, filed Jul. 23, 2004; U.S. Provisional Patent Application No. 60/201,292 filed May 2, 2000; U.S. patent application Ser. No. 10/843,352, filed May 12, 2004; and U.S. patent application Ser. No. 09/846,486, filed Apr. 18, 2002.

The joining process (e.g., soldering or brazing processes) is based on sandwiching a reactive multilayer material (e.g., a foil) between two fusible layers (e.g., solder and/or braze layers) and two components, and then chemically transforming (e.g., igniting) the foil. A self-propagating reaction is thus initiated in the foil which results in a rapid rise in the reactive foil temperature. The heat released by the reaction melts the fusible-material layers, and upon cooling, bonds the two components.

Alternatively, layers of fusible material are not used (i.e. the reactive multilayer material is placed directly between the components to be joined). By igniting (e.g., chemically transforming) the reactive multilayer material (e.g., foil), the heat release by the chemical transformation of the reactive multilayer material melts material from the adjoining surfaces of the two components, and consequently joins the components.

Reactive multilayer joining is far more rapid than conventional techniques that utilize furnaces or torches. Thus, significant gains in productivity may be achieved. In addition, with very localized heating using reactive multilayer joining, temperature sensitive components, as well as dissimilar materials such as metals and ceramics, may be joined (e.g., soldered or brazed) with little or no thermal damage. The room-temperature welding process also offers advantages in welding of bulk amorphous metals (examples of which are disclosed in article by A. J Swiston et al. entitled "Joining Bulk Metallic Glass Using Reactive Multilayer Foils" published in Scripta Metallurgica et Materialia, Volume 48, page 1575 in 2003 and U.S. Provisional Patent Application No. 60/201,292 filed May 2, 2000, the entirety of both of which are incorporated herein by reference), avoiding or minimizing crystallization, and thereby resulting in a high-strength bond. As disclosed in U.S. Provisional Patent Application No. 60/461,196 filed Apr. 9, 2003 and U.S. patent application Ser. No. 10/814,243 filed Apr. 1, 2004, hermetic sealing applications may also be enhanced by the reactive joining process.

The reactive multilayer foils used in reactive joining are typically fabricated by vapor depositing hundreds of nanoscale layers that alternate between elements with large, negative heats of mixing such as Ni and Al. Examples are disclosed in the following references, the entirety of each of which are incorporated herein by reference: U.S. Pat. Nos. 5,538,795, 5,547,715; an article by Anselmi-Tamburni et al. entitled "The Propagation of a Solid-State Combustion Wave in Ni—Al Foils" published in the Journal of Applied Physics, Volume 66, page 5039 in 1989; an article by Besnoin et al. entitled "Effect of Reactant and Product Melting on Self-Propagating Reactions in Multilayer Foils" published in the Journal of Applied Physics, Vol. 92(9), pages 5474-5481 on Nov. 1, 2002; an article by Blobaum et al. entitled "Deposition and Characterization of a Self-Propagating CuOx/Al Thermite Reaction in a Multilayer Foil Geometry" published in the Journal of Applied Physics, Vol. 94(5), pages 2915-2922 on Sep. 1, 2003; an article by Dyer et al. entitled "The Combustion Synthesis of Multilayer NiAl Systems" published in Scripta Metallurgica et Materialia, Vol. 30(10), pages 1281-1286 in 1994 ("Dyer"); an article by Gavens et al. entitled "Effects of Intermixing on Self-Propagating Exothermic Reactions in Al/Ni Nanolaminate Nanofoils" published in the Journal of Applied Physics, Vol. 87(3), pages 1255-1263 on Feb. 1, 2000 ("Gavens"); an article by Reiss et al. entitled "Self-propagating Formation Reactions in Nb/Si Multilayers" published in Mat. Sci. and Eng. A., Volume A261, pages 217-222 in 1999; a book entitled "Selected Values of Thermodynamic Properties of Metals and Alloys" edited by Hultgren et al. and published by Wiley of New York City in 1963; an article by van Heerden et al. entitled "Metastable Phase Formation and Microstructural Evolution during Self-Propagating Reactions in Al/Ni and Al/Monel Multilayers" published in Mat. Res. Soc. Symp. Proceedings, Volume 481, pages 533-8 in the Fall of 1997; U.S. patent application Ser. No. 09/846,486, filed Apr. 18, 2002; U.S. Provisional Patent Application No. 60/201,292, filed May 2, 2000; a chapter entitled "Self-Propagating Reactions in Multilayer Materials" published in the 1998 edition of the *Handbook of Thin Film Process Technology* edited by D. A. Glocker and S. I. Shah; and an article entitled "Self-Propagating Exothermic Reactions in Nanoscale Multilayer Materials" that was presented at The Minerals, Metals, and Materials Society (TMS) Proceeding on Nanostructures in February of 1997 ("TMS").

Recent developments have shown that it may be possible to carefully control both the heat of the reaction as well as the reaction velocity, and have also provided alternative means for fabricating nanostructured multilayers. For instance, it has been demonstrated that the velocities, heats, and temperatures of the reactions can be controlled by varying the thicknesses of the alternating layers. Examples are disclosed in the following references, the entirety of each of which are incorporated herein by reference: U.S. Pat. No. 5,538,795; Dyer; Gavens; U.S. patent application Ser. No. 09/846,486, filed Apr. 18, 2002; and U.S. Provisional Patent Application No. 60/201,292, filed May 2, 2000. It has also been shown that the heats of reaction can be controlled by modifying the foil composition, or by low-temperature annealing of the reactive multilayers after their fabrication, for example, as disclosed in Gavens. Alternative methods for fabricating nanostructured reactive multilayers include: (i) mechanical processing, for example, as described in U.S. Pat. No. 6,534,194, the entirety of which is incorporated herein by reference, and (ii) electro-chemical deposition.

Two advantages achieved by the use of reactive foils are speed and localization of heat to the joint area. Both result in technological advantages over conventional soldering or brazing methods, particularly for applications involving temperature-sensitive components, or metal/ceramic bonding. In conventional welding or brazing, temperature-sensitive components can be destroyed or damaged during the process, and thermal damage to the materials may necessitate costly and time-consuming operations, such as subsequent anneals or heat treatments. In contrast, when joining with reactive multilayer foils, the components receive little heat and experience a limited rise in temperature. Only the braze layers and the surfaces of the components are heated substantially. Thus, thermal damage problems are naturally avoided. In addition, the reactive joining process is fast, and results in cost-effective, strong, and thermally-conductive joints. Substantial commercial advantages can thus be achieved, particularly for assembly of fiber optic components, hermetic sealing, for example, as disclosed in U.S. Provisional Patent Application No. 60/461,196 filed Apr. 9, 2003 and U.S. patent application Ser. No. 10/814,243 filed Apr. 1, 2004; and heat-sink mounting, for example, as disclosed in an article by Van Heerden et al. entitled "A Ten Fold Reduction in Interface Thermal Resistance for Heat Sink Mounting" which was presented at the proceedings of IMAPS 2003 Symposium ("Van Heerden"), the entirety of all of which are incorporated herein by reference.

Several characteristics of the reactive joining process have been investigated, for example, as disclosed in U.S. Pat. No. 5,381,944. In particular, investigations have shown that, due to densification associated with the reaction as well as cooling from the high reaction temperature, cracking occurs within the reactive multilayer foil. These cracks are typically filled by molten material, namely the fusible material in reactive soldering or brazing or molten component material in reactive welding. The flow of molten material within the cracks that form in the foil has been shown to be a factor controlling joint properties, including mechanical strength, for example, as disclosed in U.S. Provisional Patent Application No. 60/201,292, filed May 2, 2000.

Accordingly, recent efforts have focused at controlling the flow of fusible material in reactive multilayer joining. In particular, these efforts have shown that the duration of melting is affected by the physical properties of the foil, the fusible material and the components being joined, for example, as disclosed in Van Heerden. In addition, it has recently been shown that the pressure applied on the component also affects the flow of molten material, the ability of the molten material to fill cracks appearing the reactive foil, and consequently the joint properties, for example, as disclosed in U.S. patent application Ser. No. 10/898,650, filed Jul. 23, 2004, the entirety of which is incorporated herein by reference.

While applied pressure is known to constitute an important factor in reactive joining, methods for applying and maintaining the pressure have not been investigated. Specifically, prior efforts have relied on the use of vices or mechanical presses as mean to apply the pressure, for example, as disclosed in U.S. patent application Ser. No. 10/898,650, filed Jul. 23, 2004, filed Jul. 23, 2003; U.S. patent application Ser. No. 09/846,486, filed Apr. 18, 2002; and U.S. Provisional Patent Application No. 60/201,292, filed May 2, 2000. While these approaches may be effective in exerting an initial load on the assembly, they may suffer from the disadvantage that pressure cannot be maintained nor controlled during the joining. During reactive joining, the molten material flows into the cracks that form in the reactive foil as a result of densification due to the reaction, and shrinkage due to cooling. The flow of molten material is enhanced by the applied pressure. However, the flow of molten material generally tends to relieve the applied pressure. Vices and presses are typically inadequate in mitigating the impact of this flow, which consequently results in sudden and dramatic drop in the applied pressure. As further discussed below, this pressure reduction effect has detrimental impact on joint properties. Moreover, joint properties may vary significantly from one loading system to another, even if the same pressure is applied initially.

SUMMARY OF THE INVENTION

An embodiment of the invention includes a method including the steps of providing at least two components to be joined, a reactive multilayer foil, and a compliant element, placing the reactive multilayer foil between the at least two components, applying pressure to the at least two components and the reactive multilayer foil via the compliant element, and initiating a chemical transformation of the reactive multilayer foil so as to physically join the at least two components. The invention may also or alternatively include a joint formed using this method.

Another embodiment of the invention includes a method including the steps of providing at least two components to be joined, a reactive multilayer foil, and a dead weight, placing the reactive multilayer foil between the at least two components, applying pressure to the at least two components and the reactive multilayer foil via the dead weight, and initiating a chemical transformation of the reactive multilayer foil so as to physically join the at least two components. The invention may also or alternatively include a joint formed using this method.

A further embodiment of the invention includes an apparatus including a compliant assembly including at least one compliant element. The compliant assembly is configured to apply pressure to at least two components and a reactive multilayer foil disposed between the at least two components via the at least one compliant element.

Yet another embodiment of the invention includes a compliant assembly including at least one weight. The compliant assembly is configured to apply pressure to at least two components and a reactive multilayer foil disposed between the at least two components via the at least one weight.

In various embodiments, the invention may include one or more of the following aspects: the compliant element may be configured such that the pressure applied to the at least two components and the reactive multilayer foil after initiating a chemical transformation the reactive multilayer foil is between about 80% and about 120% of the pressure applied to the at least two components and the reactive multilayer foil prior to initiating the chemical transformation of the reactive multilayer foil; the compliant element may be a spring; the compliant element may be a plunger; the compliant element may be a component of at least one of a pneumatic system, a hydraulic system, and a piezoelectric system; the compliant element may be a deformable material; the deformable material may be a deformable pad; the compliant element may be a portion of an active feedback system; the active feedback system may be at least one of a pneumatic system, a hydraulic system, and a piezoelectric system; providing one or more fusible layers and arranging the one or more fusible layers between the reactive multilayer foil and the at least two components; at least one of the one or more fusible layer may be at least one of solder or braze; coating one or more adhesion layers on one or more surfaces of the reactive multilayer foil; and at least one of the one or more adhesion layers may include Incusil.

In various embodiments, the invention may include one or more of the following aspects: the compliant assembly may include one or more portions configured to have the at least two components and the reactive multilayer foil disposed between the one or more portions; at least one of the one or more portions may be configured to be placed in contact with at least one of the at least two components; the at least one compliant element may be configured to be disposed between at least one of the one or more portions and at least one of the at least two components; a first of the one or more portions may be disposed between the at least one compliant element and a second of the one or more portions different from the first of the one or more portions; the at least one compliant element may include at least two compliant elements; the at least one compliant element may be configured such that the pressure applied to the at least two components and the reactive multilayer foil after initiating a chemical transformation of the reactive multilayer foil is between about 80% and about 120% of the pressure applied to the at least two components and the reactive multilayer foil prior to initiating the chemical transformation of the reactive multilayer foil; the at least one compliant element may be a spring; the at least one compliant element may be a plunger; the at least one compliant element may be a component of at least one of a pneumatic system, a hydraulic system, and a piezoelectric system; the at least one compliant element may be a deformable material; the deformable material may be a deformable pad; the at least one compliant element may be a portion of an active feedback system; the active feedback system may be at least one of a pneumatic system, a hydraulic system, and a piezoelectric system; the at least one weight may be configured to be disposed between at least one of the one or more portions and at least one of the at least two components; a first of the one or more portions may be disposed between the at least one weight and a second of the one or more portions different from the first of the one or more portions; and the at least one weight may include at least two weights.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

An exemplary objective of this invention is to overcome the drawbacks noted above. Consistent with an aspect of the invention, a compliant element is introduced. The compliant assembly may be capable of compensating for a reduction in height (e.g., bond line thickness) occurring during the reactive joining process, and consequently maintain a substantially constant pressure. As further discussed below, this approach results in reactive joints with superior properties compared to similar joints obtained in a stiff non-compliant system that use a vice, mechanical press, or a screw-driven compression load frame.

Reference will now be made in detail to the exemplary embodiments of the invention, examples of which are illustrated in the accompanying drawings. Wherever possible, the same reference numbers will be used throughout the drawings to refer to the same or like parts.

Figure 1:
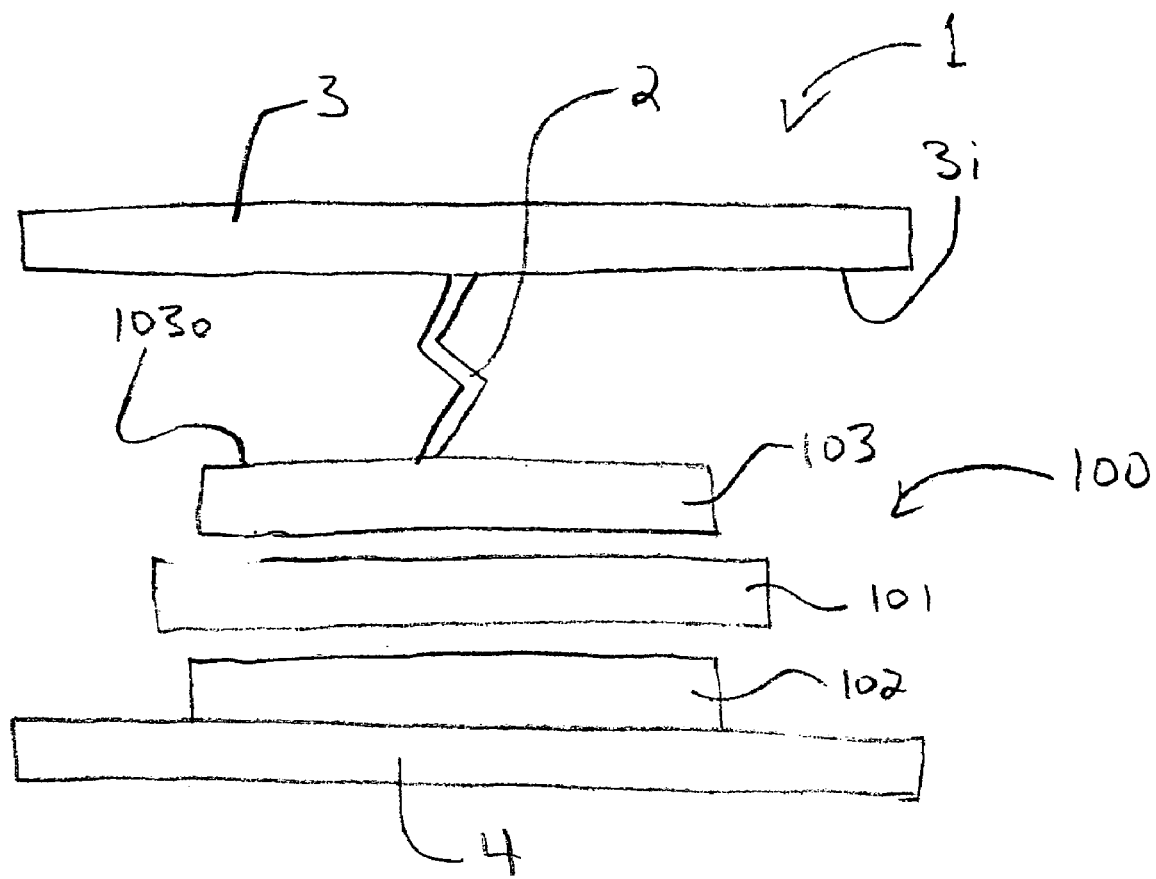
FIG. 1 depicts a compliant assembly and joining assembly according to an embodiment of the invention.

In one exemplary embodiment of this invention, as schematically illustrated in FIG. 1, a compliant assembly 1 (e.g., mechanical press or vice) may include a compliant element 2 (e.g., a spring). Compliant element 2 may be suitably positioned within assembly 1 between one or more portions 3, 4 (e.g., plates) of the compliant assembly 1. A joining assembly 100 may include a reactive multilayer material 101 (e.g., foil) disposed between one or more components 102, 103 to be joined, and joining assembly 100 may be disposed between portions of compliant assembly 1, for example, one or more of plates 3, 4, and/or spring 2. Spring 2 may be disposed between an outer surface 103o of component 103 of joining assembly 100 and an inner surface 3i of portion 3 so as to provide compliance and/or maintain pressure on joining assembly 100 during the joining process.

Figure 12:
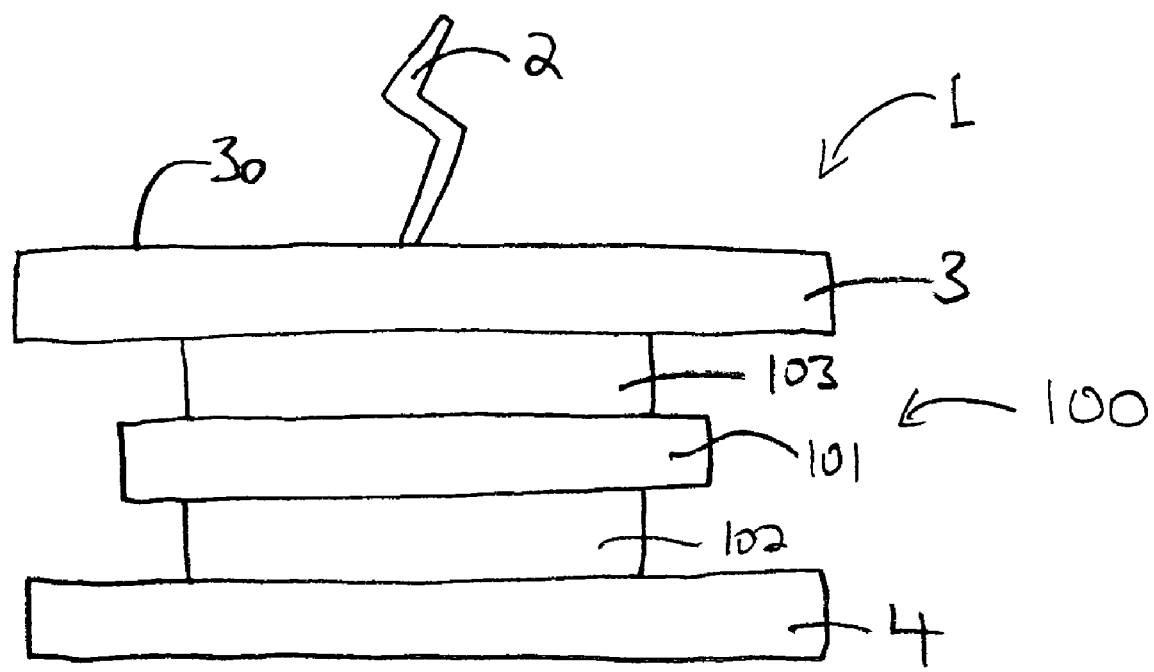
FIG. 12 depicts a compliant assembly and joining assembly according to another embodiment of the invention.
Figure 1:
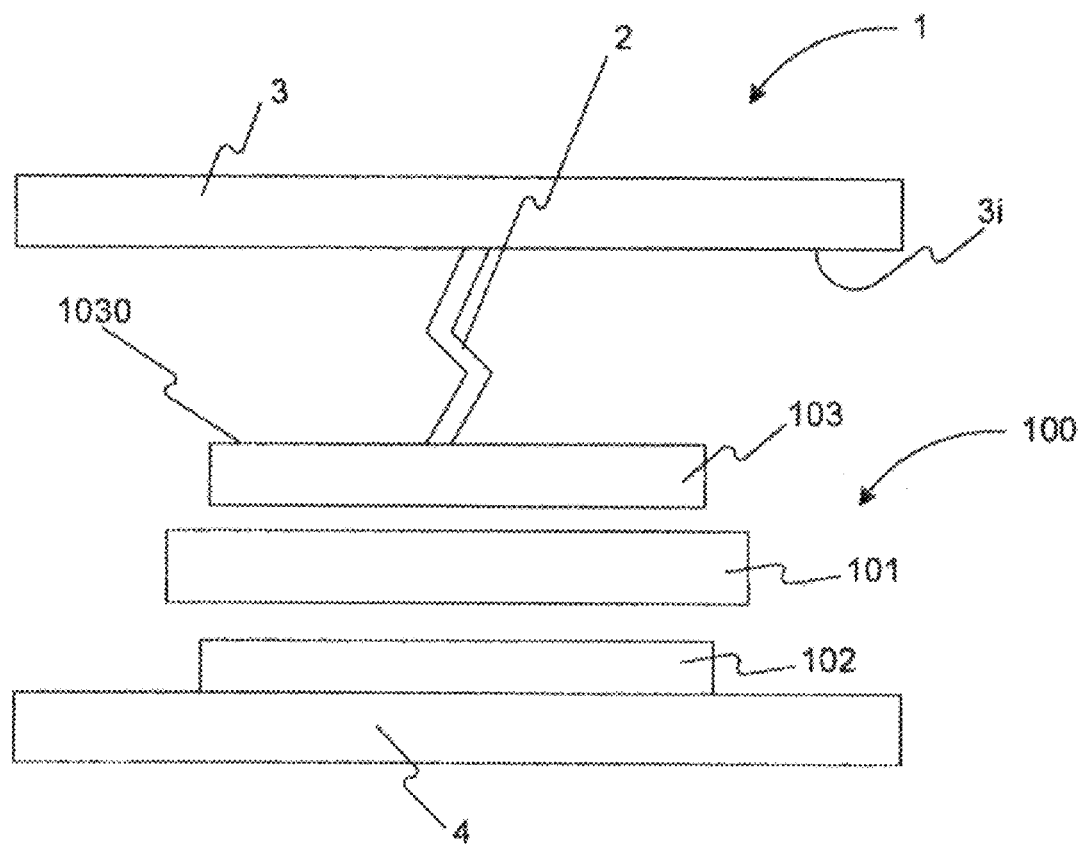
Figure 2:
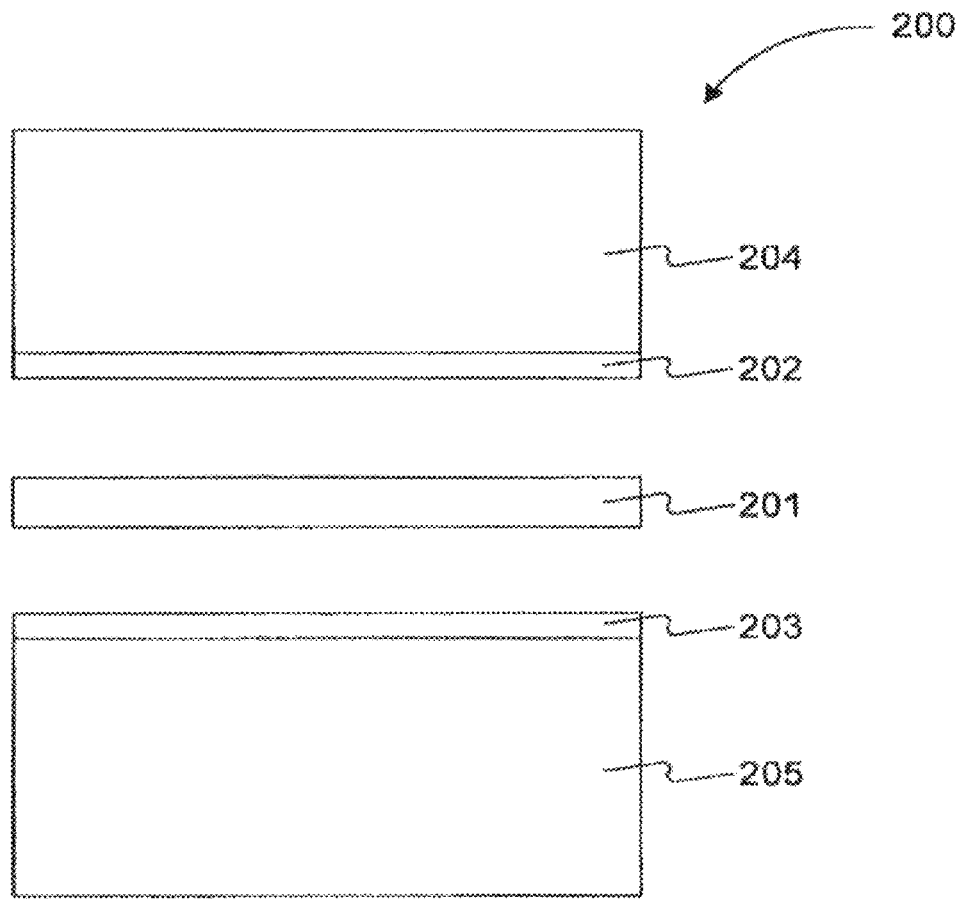
Figure 3A:
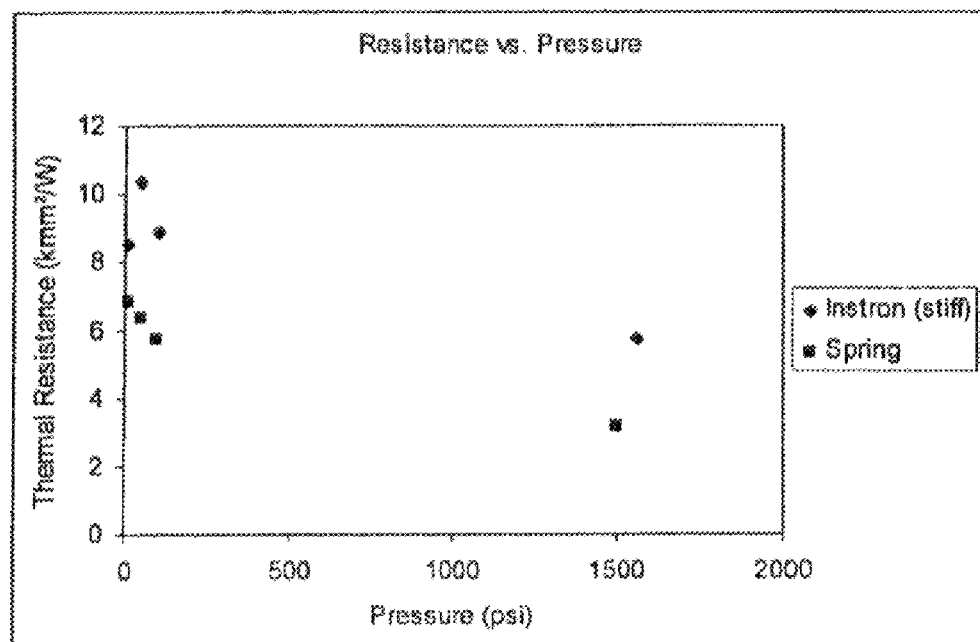
Figure 3B:
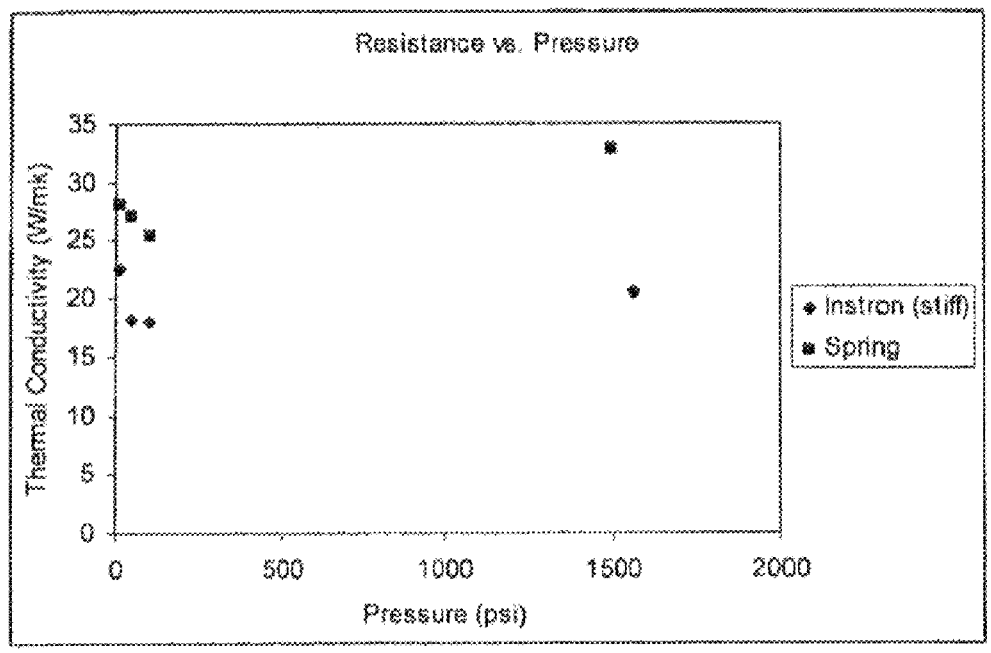
Figure 4:
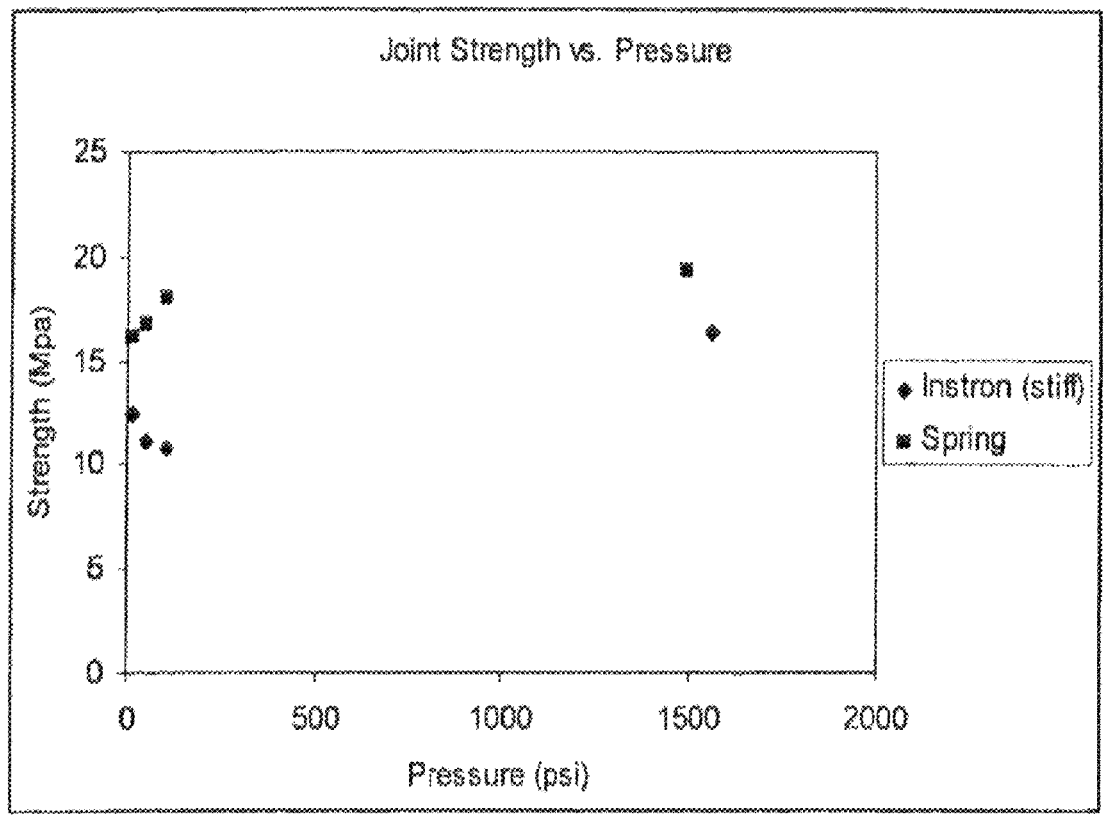
Figure 5A:
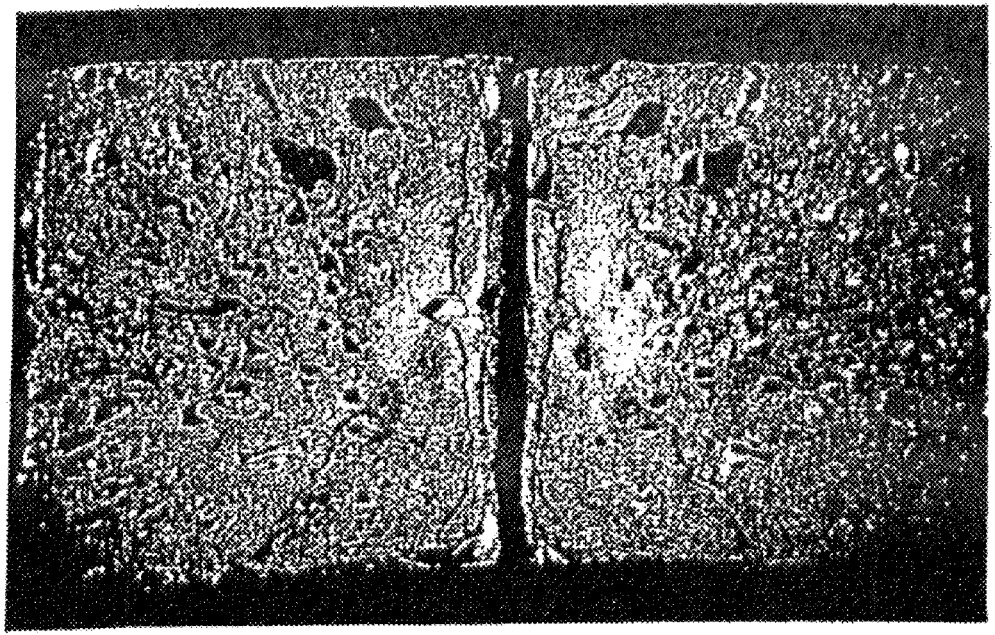
Figure 5B:
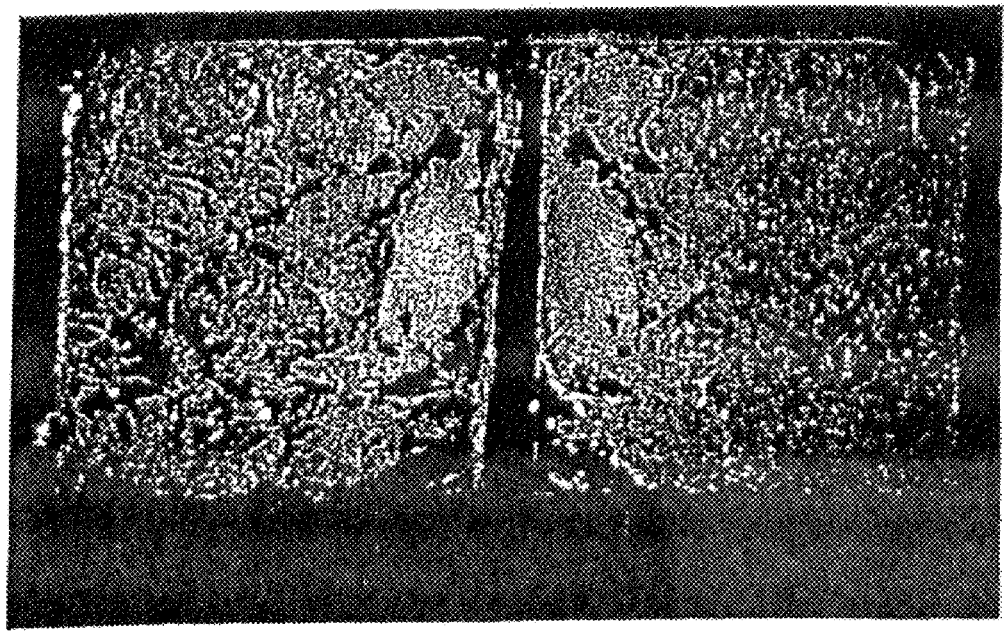
Figure 6:
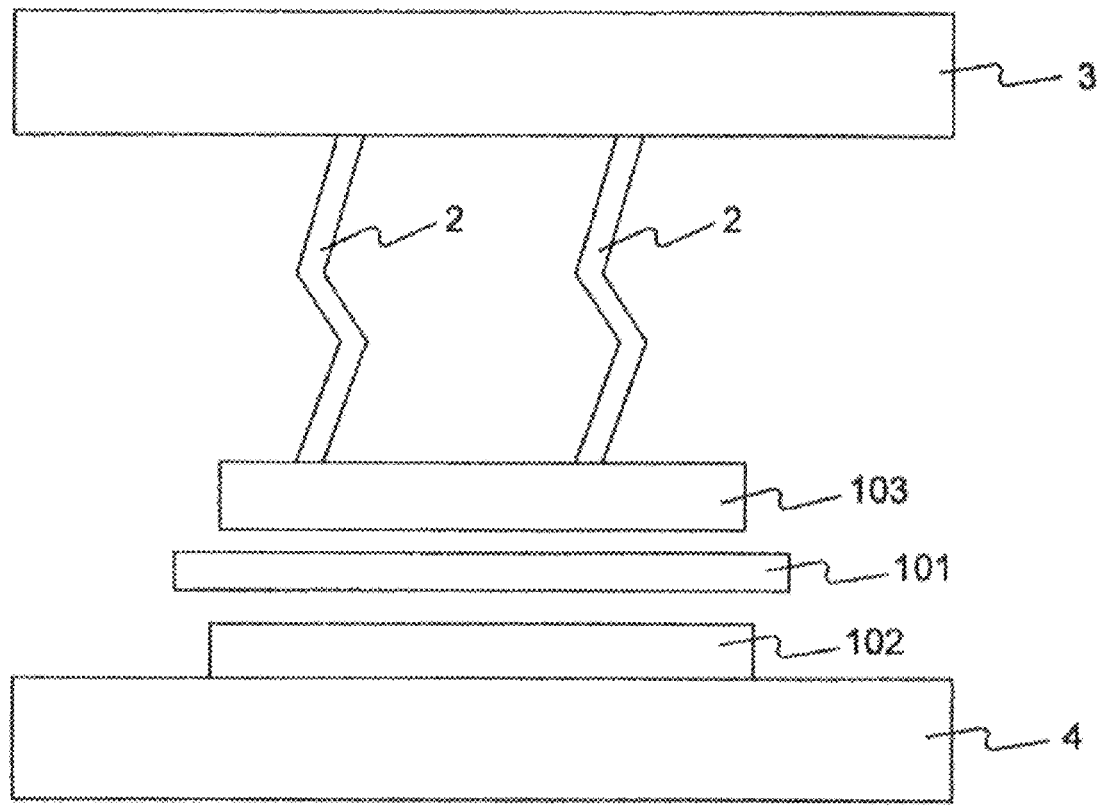
Figure 7:
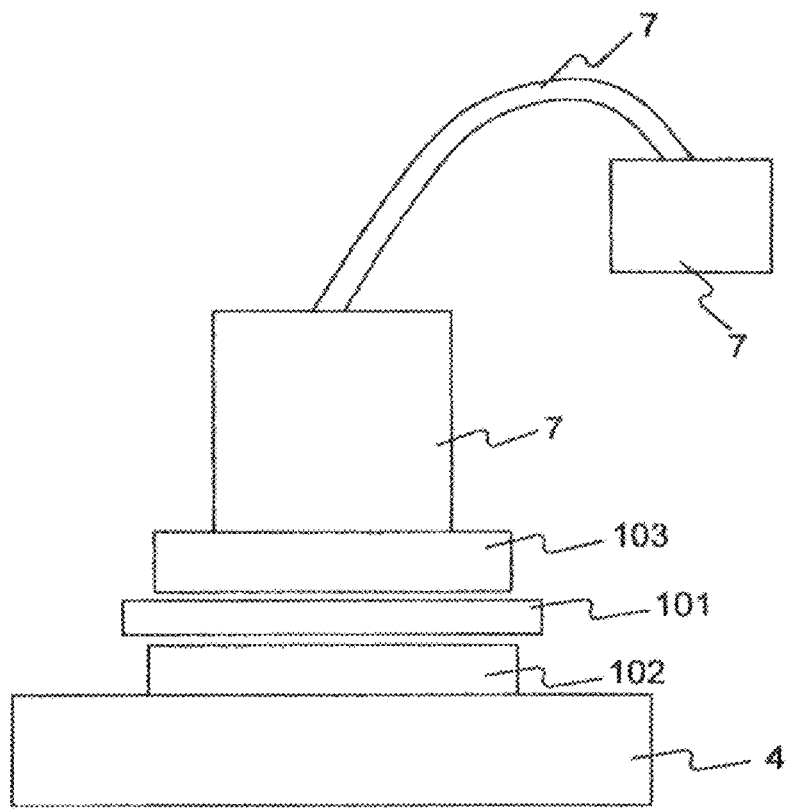
Figure 8:
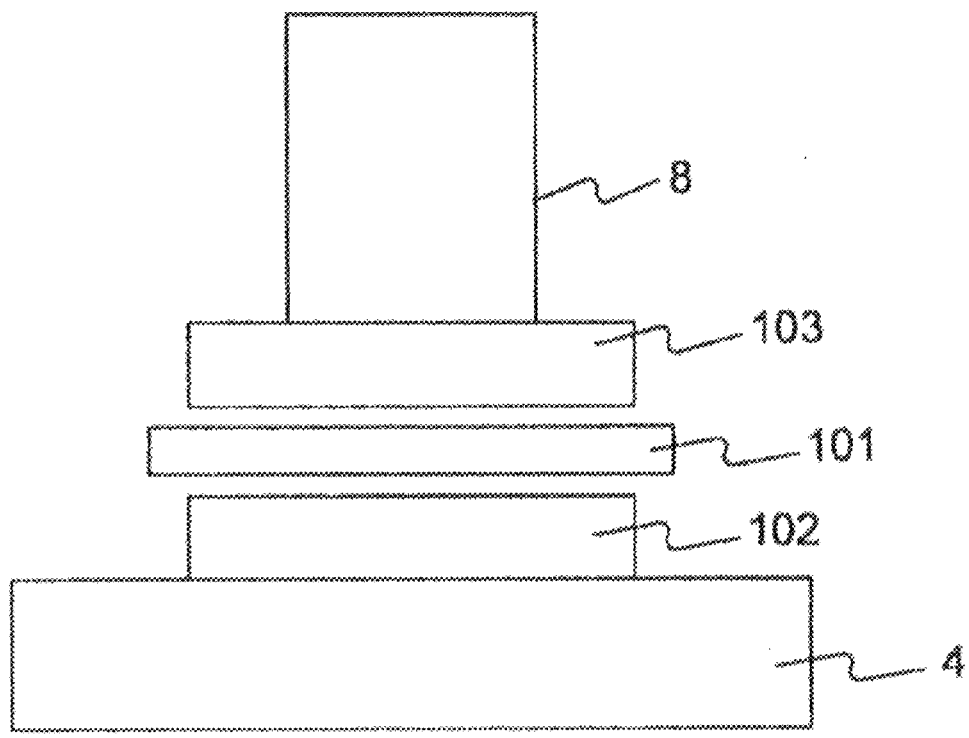
Figure 9:
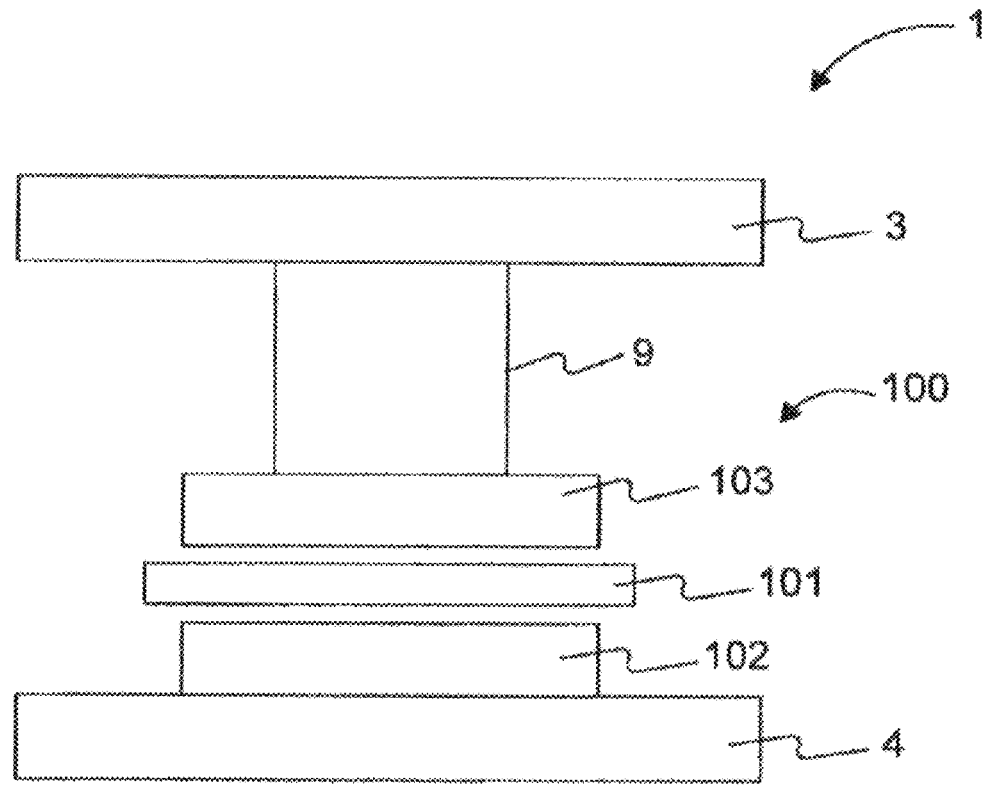
Figure 10:
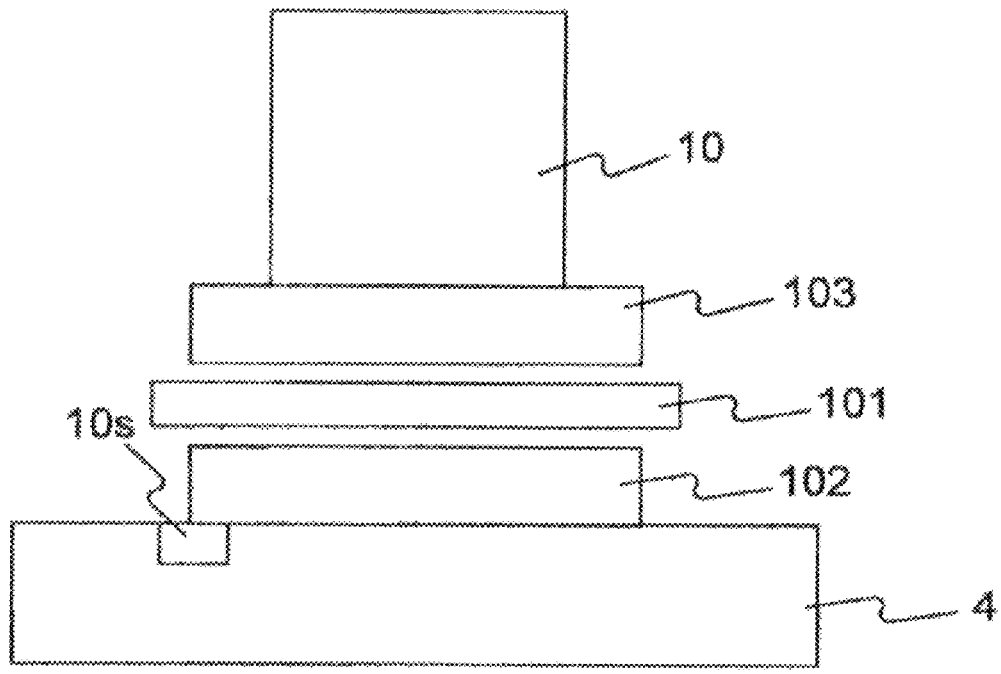
Figure 11:
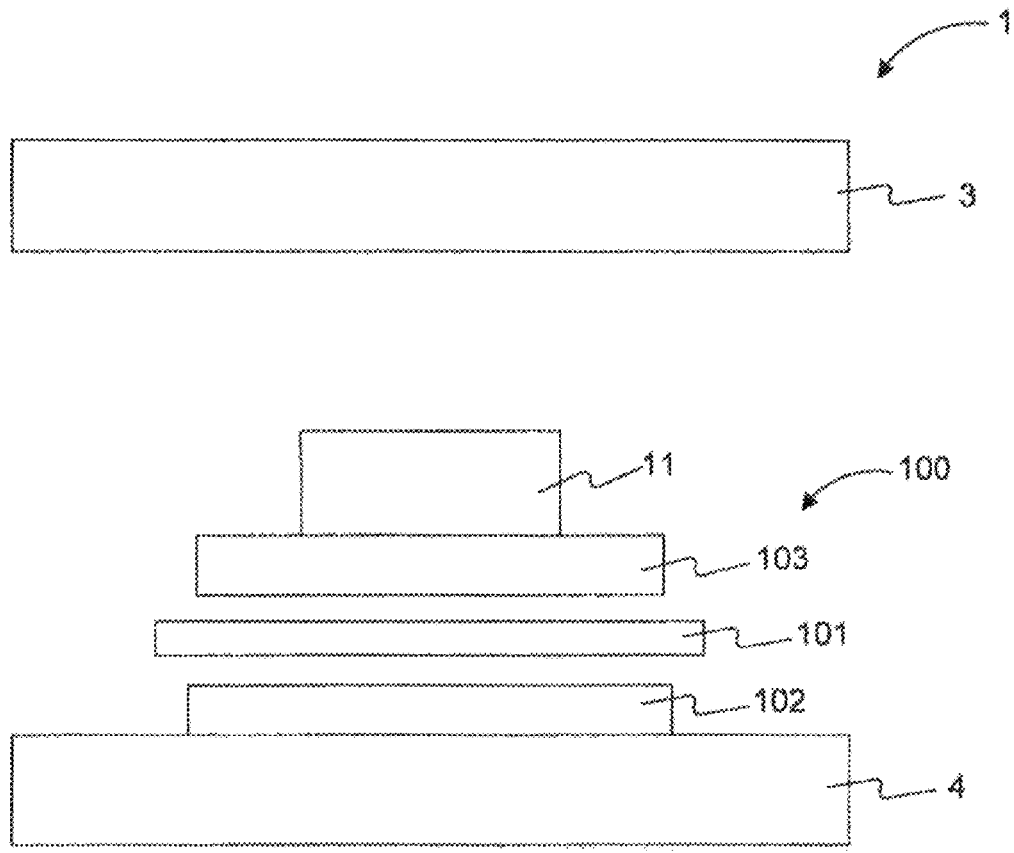
Figure 12:
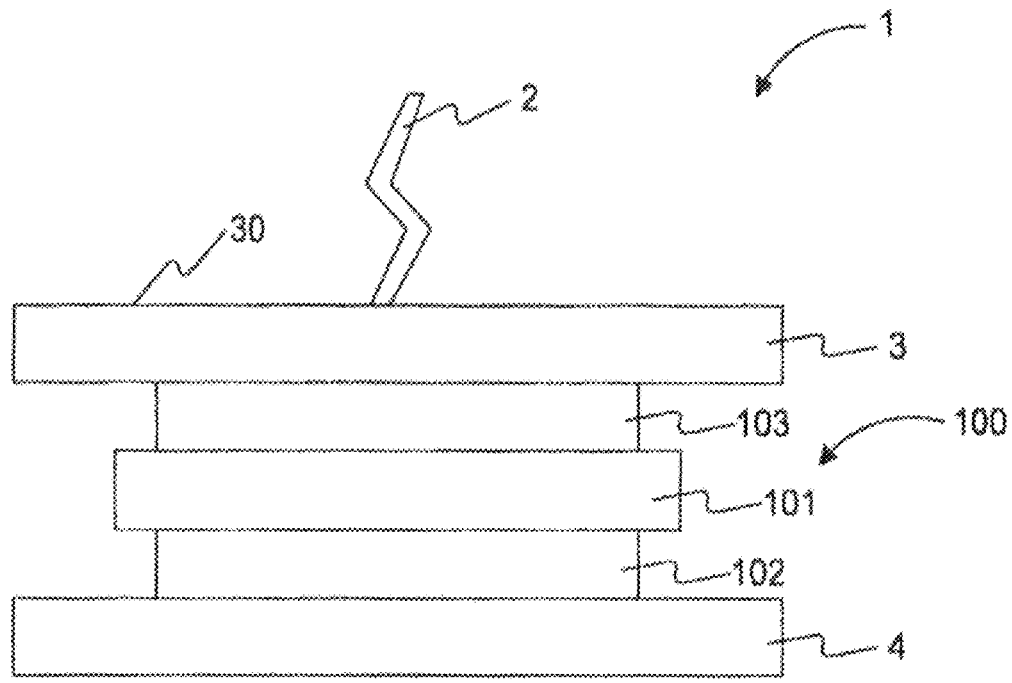

In various embodiments, compliant assembly 1 and joining assembly 100 may have a variety of configurations. For example, a reactive foil 101 may be disposed in between two components 102, 103 to be joined, and a compliant element 2 may be placed in contact with at least one of the two components 102, 103. In another example, a foil 201 may be disposed in between a fusible layer 202 disposed on a component 204 to be joined and another component 205 to be joined, with a compliant element 2 placed in contact with at least one of the two components 204, 205. In a further example, a foil 201 may be disposed between fusible layers 202, 203 disposed on each of two components 204, 205 to be joined, with a compliant element 2 placed in contact with at least one of the two components 204, 205. In yet another example, any combination of the foil 101, components 102, 103, and/or fusible layers (e.g., as set forth herein) may be placed in contact with one or plates 3, 4. A compliant element 2 may be placed in contact with at least one of the one or more plates 3, 4, for example, in contact with an outer surface 3o of plate 3 as shown in FIG. 12. In a yet further example, any combination of the foil, components, and/or fusible layers (e.g., as set forth herein) may be placed in contact with one or more plates of the compliant assembly. Alternatively, one or more compliant elements may be respectively placed in contact with the one or more plates.

Figure 6:
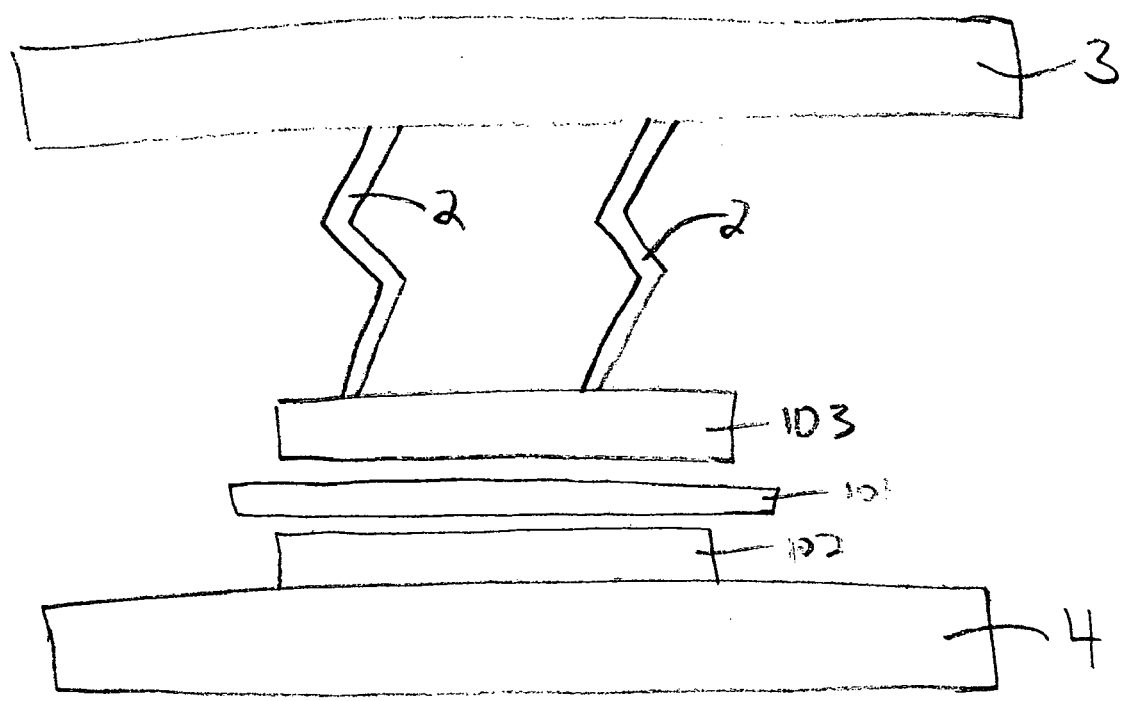
FIG. 6 depicts a compliant assembly and joining assembly according to another embodiment of the invention.
Figure 7:
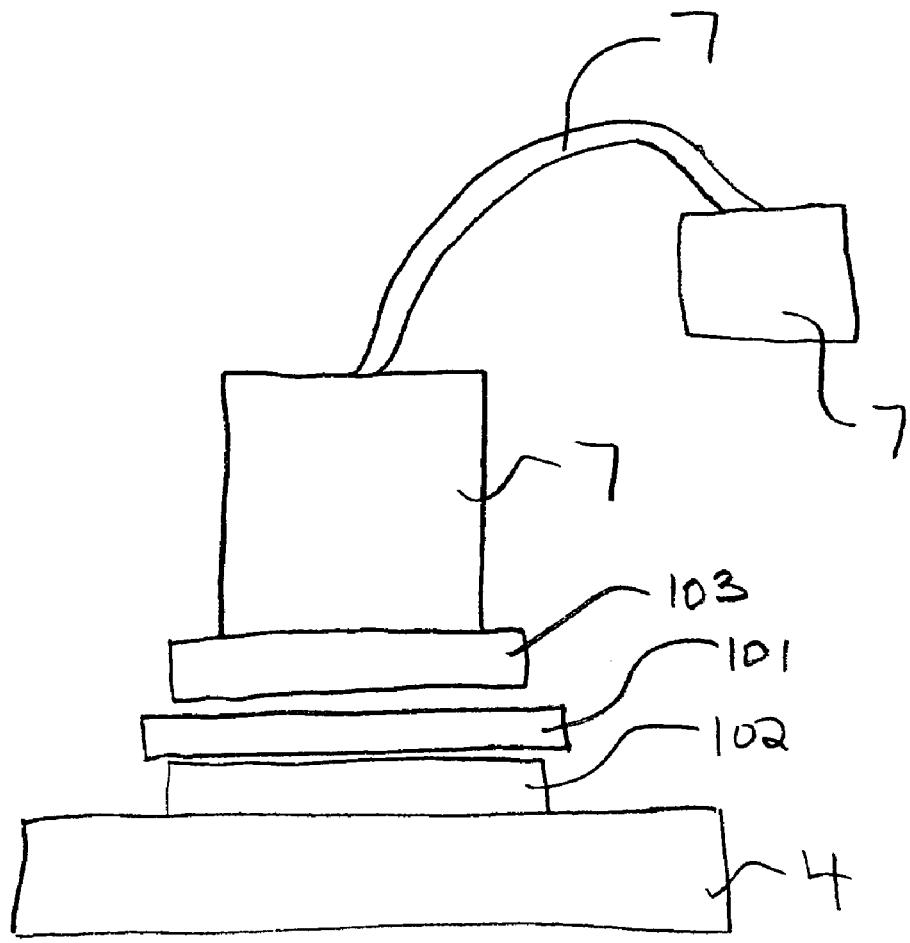
FIG. 7 depicts a compliant assembly and joining assembly according to a further embodiment of the invention.
Figure 8:
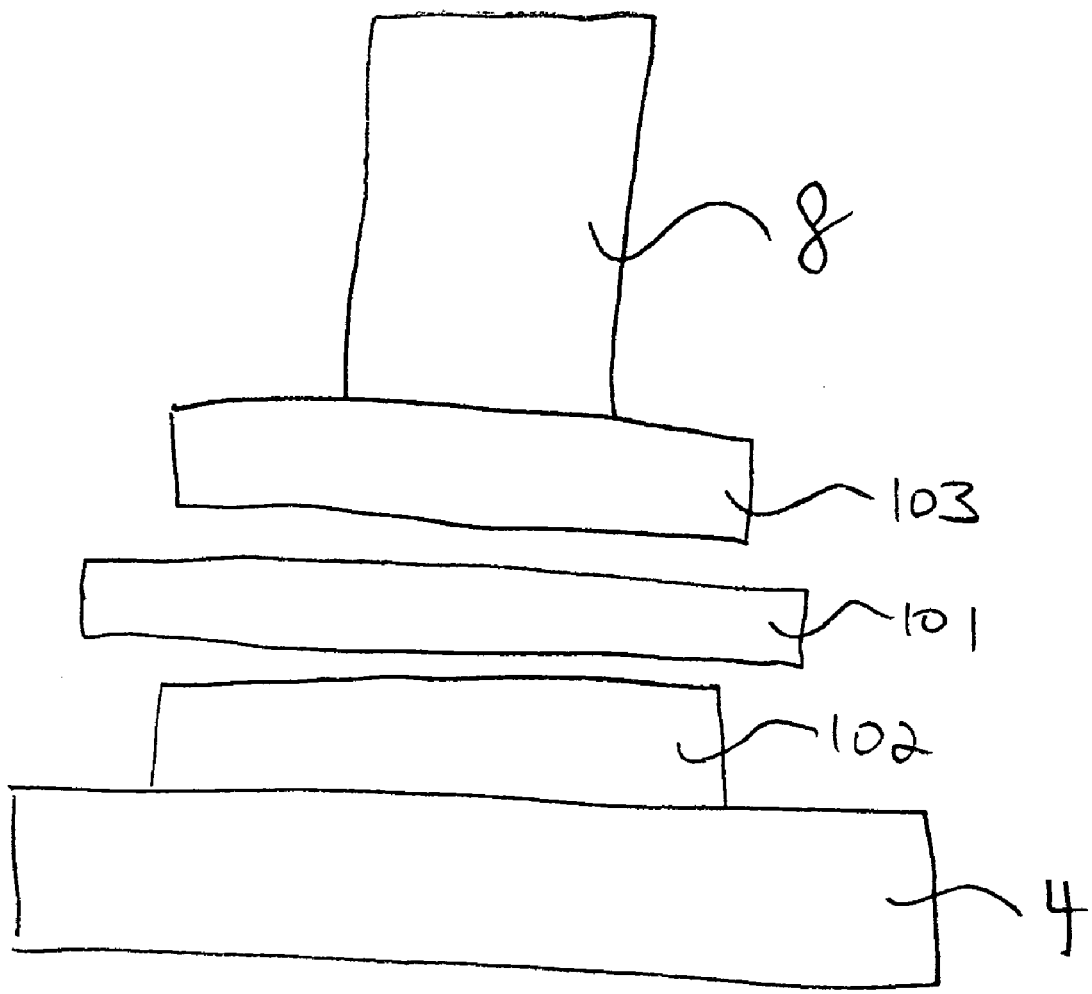
FIG. 8 depicts a compliant assembly and joining assembly according to yet another embodiment of the invention.
Figure 9:
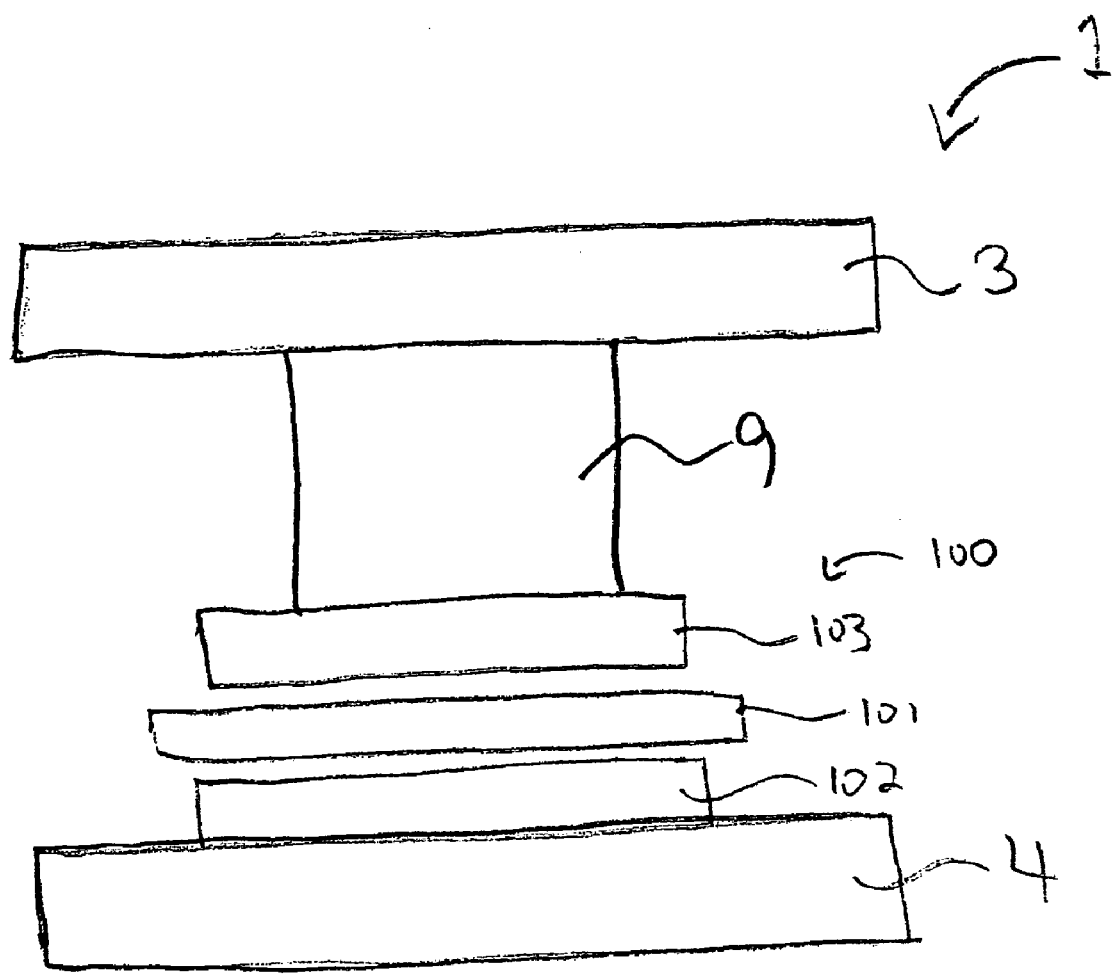
FIG. 9 depicts a compliant assembly and joining assembly according to a yet further embodiment of the invention.
Figure 10:
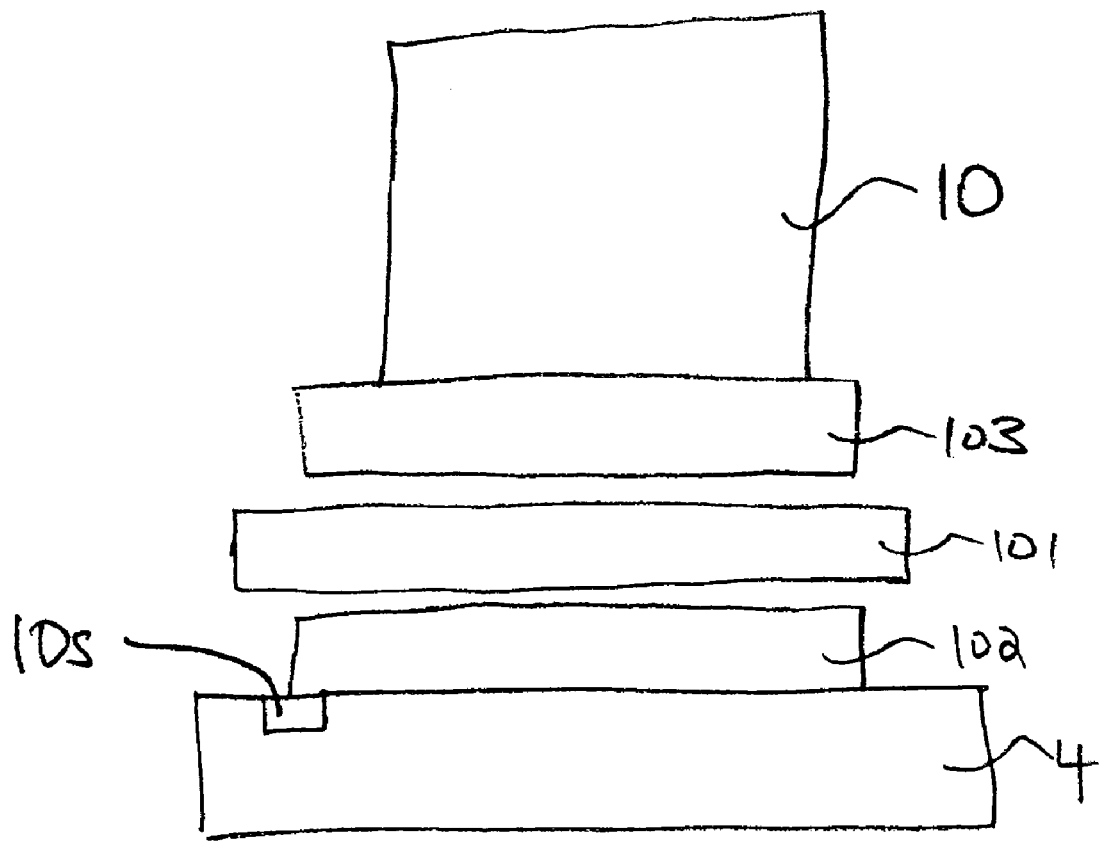
FIG. 10 depicts a compliant assembly and joining assembly according to still another embodiment of the invention.

Compliant assembly 1 and/or joining assembly 100 may have other alternate configurations that may include one or more of the following aspects. For example, as shown in FIG. 6, compliant assembly 1 may be include one or more compliant elements 2. Compliant element 2 may include one or more of a pneumatic system 7 (e.g., as indicated in FIG. 7), plunger 8 (e.g., as indicated in FIG. 8), and a deformable pad 9 (e.g., as indicated in FIG. 9). The compliance, for example of compliant element 2, may be provided by an active feedback system 10 (e.g., as indicated in FIG. 10 and/or including a sensor 10s). Active feedback system 10 may include, for example, a pneumatic system, a hydraulic system, or piezoelectric system. The active feedback system may be configured to adjust the pressure applied to the joining assembly 100 (e.g., via the compliant element 2), for example, to compensate for the rapid expansion and contraction within the joining assembly 100 when the joining assembly 100 is undergoing the joining process (e.g., after the chemical transformation of the reactive multilayer foil has been initiated). For example, it may be desirable to keep a constant pressure on the joining assembly 100 during the joining process. When the chemical transformation of the foil 101 is initiated, the pressure on the joining assembly 100 may initially increase from the expansion of the foil 101, in which case the active feedback system 10 may compensate (e.g., by measuring pressure via one or more sensors 10s) by decreasing pressure on the joining assembly 100 applied by the active feedback system 10 (e.g., via a compliant element that is a portion of active feedback system 10) in order to maintain a constant pressure on the joining assembly 100. When the joining assembly 100 begins to cool thereafter, the pressure on the joining assembly 100 from the chemical transformation itself may decrease, in which case the active feedback system 10 may compensate by increasing pressure on the joining assembly 100 applied by the active feedback system 10 (e.g., via a compliant element that is a portion of active feedback system 10) in order to maintain a constant pressure on the joining assembly 100 throughout the joining process.

Examples of acceptable pneumatic systems include a pressure vessel having a plunger that applies pressure to the joining assembly, a diaphragm based mechanical gas regulator (e.g., manufactured by VICTOR EQUIPMENT COMPANY®), and/or an electropneumatic gas regulator (e.g., manufactured by PARKER LUCIFER SA®). Example of acceptable plungers include round nose spring plungers (e.g., sold by MACMASTER CARR®). Examples of acceptable deformable pads includes those made out of rubber or any suitable polymer. Examples of acceptable active feedback systems include dynamic material fatigue test systems (e.g. a MTS 858 TABLETOP TEST SYSTEM® manufactured by MTS SYSTEMS CORPORATION).

Figure 11:
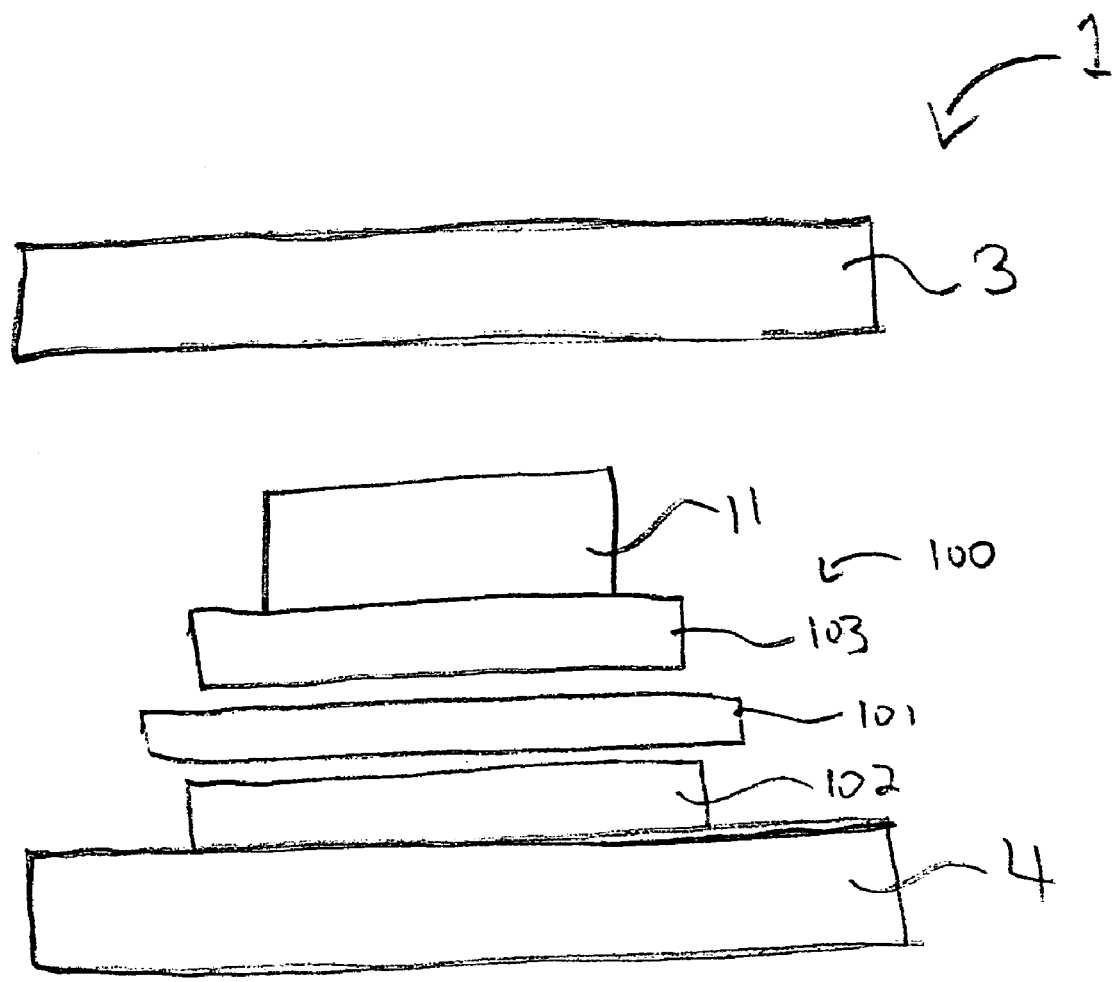
FIG. 11 depicts a compliant assembly and joining assembly according to a still further embodiment of the invention.

Effective compliance may also or alternately be provided by applying a weight 11 to the system (e.g., compliant assembly 1 and/or joining assembly 100) during joining, for example, as shown in FIG. 11. Weight 11 may be applied directly to the top of joining assembly 100 as shown in FIG. 11 and/or weight 11 may be applied to compliant assembly 1, for example, on top of at least one of plates 3, 4.

Joining assembly 100 may include one or more layers of fusible material disposed between the reactive multilayer foil 101 and the components to be joined 102, 103. For example, as disclosed in U.S. Provisional Patent Application No. 60/461,196 filed Apr. 9, 2003 and U.S. patent application Ser. No. 10/814,243 filed Apr. 1, 2004, the layers of the fusible material may adhere to one or more of foil 101 and/or component(s) 102, 103, and/or may be used as free-standing sheets. One or more surfaces of reactive multilayer foil 101 may be coated with one or more adhesion layers, such as Incusil.

Figure 2:
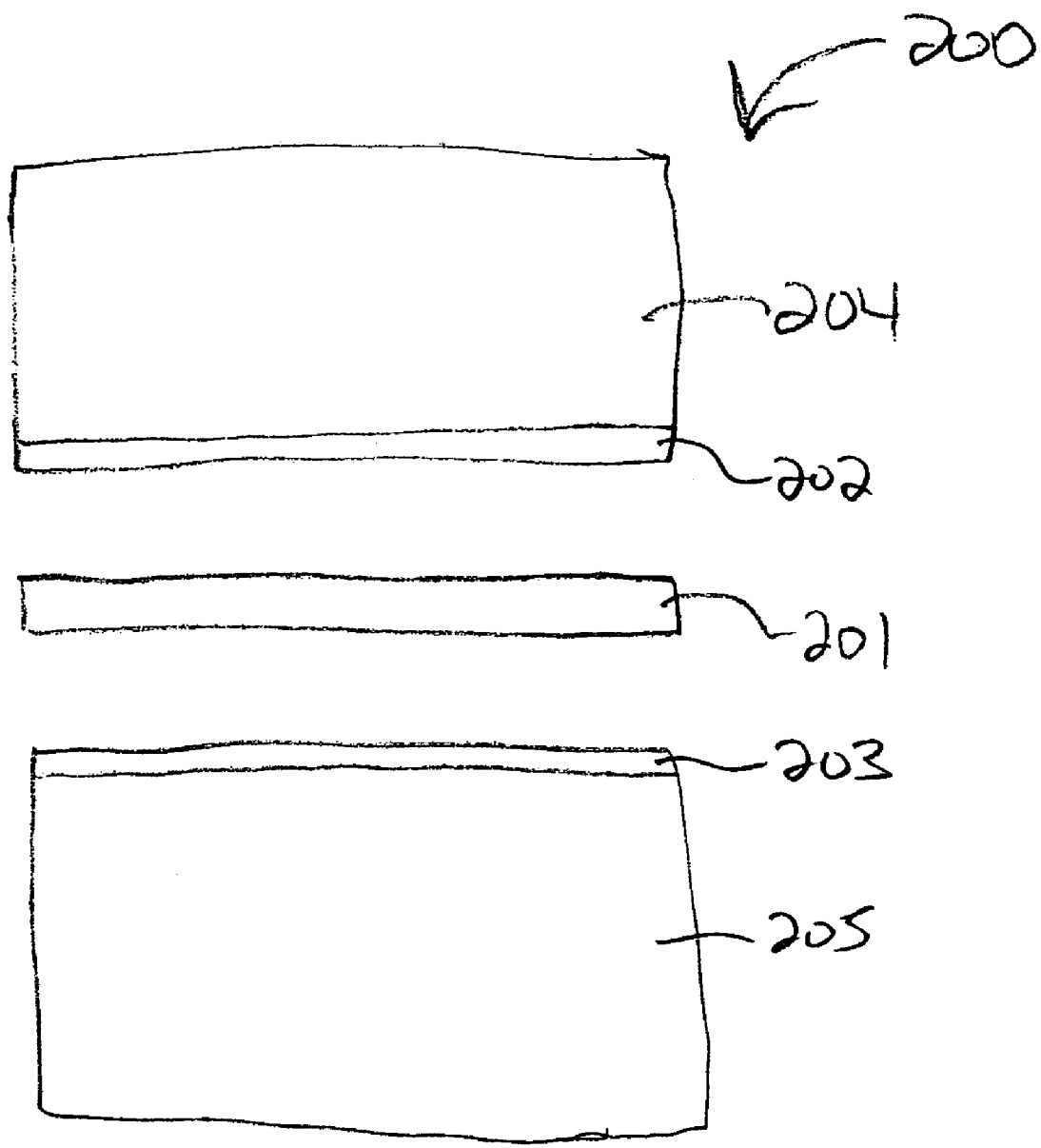
FIG. 2 depicts a joining assembly accordingly another embodiment of the invention.

In another embodiment of this invention, the advantages of using a compliant assembly 1 including a compliant element 2 may be assessed by comparing the thermal and/or mechanical properties of the resulting joints with those of a similar joint formed using a stiff mechanical press. The reactive joining configuration shown in FIG. 2 is used to illustrate these advantages. FIG. 2 includes a joining configuration 200 including a foil 201, one or more adhesion or prewetting layers 202, 203, and one or more components 204, 205 (e.g., made out of copper).

Figures 3A, 3B:
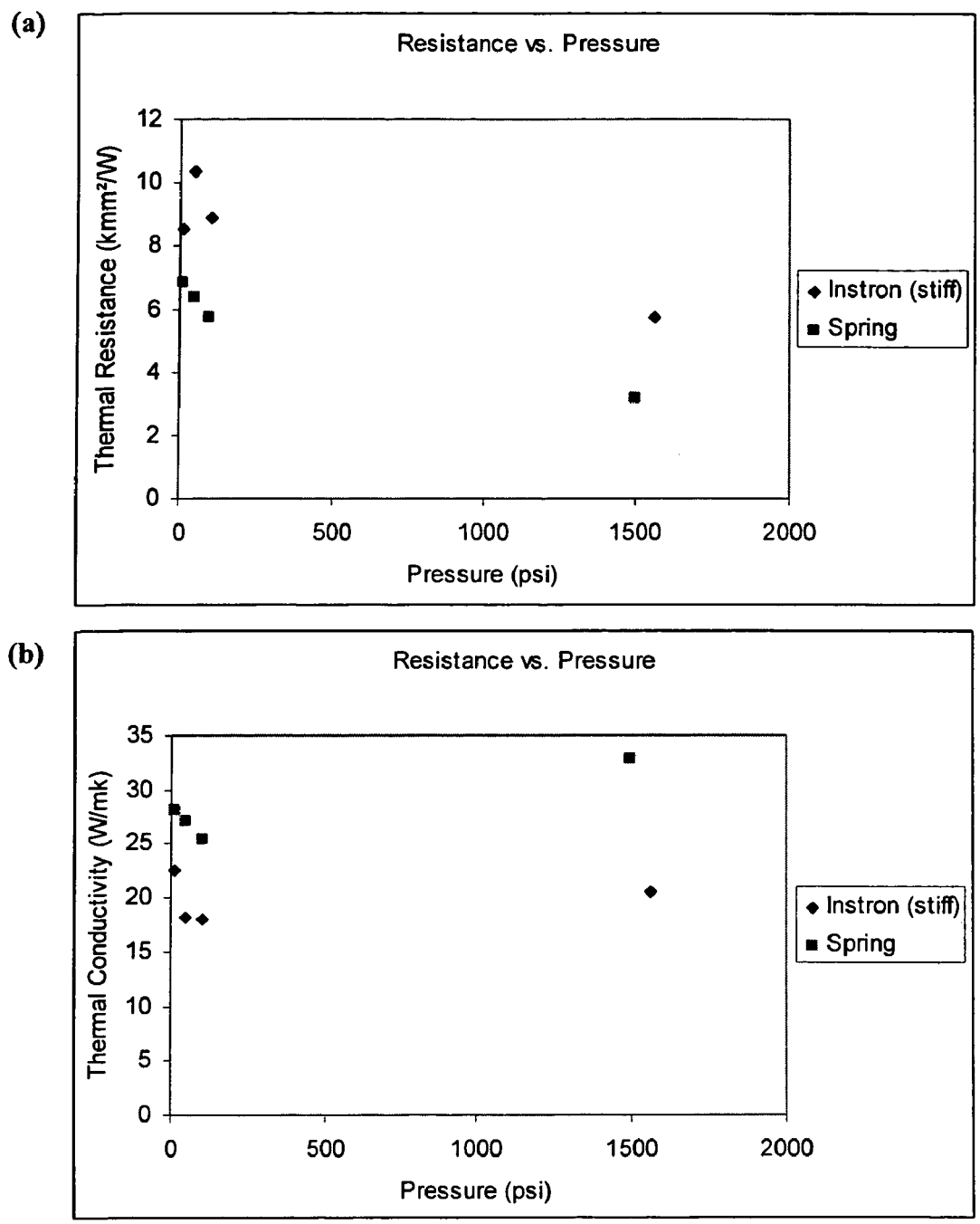
FIG. 3a depicts the results of the joining assembly of FIG. 2 joined using the compliant assembly of FIG. 1 as compared to an assembly without a compliant element according to a further embodiment of the invention.
FIG. 3b depicts the results of the joining assembly of FIG. 2 joined using the compliant assembly of FIG. 1 as compared to an assembly without a compliant element according to yet another embodiment of the invention.

FIGS. 3a and 3b respectively show the thermal resistance and effective thermal conductivity of reactive joints corresponding to the joining assembly configuration shown in FIG. 2. Infrared thermometry was used for the purpose of determining thermal resistance and effective thermal conductivity, for example, as disclosed in Van Heerden. Plotted are results obtained by: (a) inserting the joining assembly 200 in a compression load-frame which does not include a complaint element (e.g., a materials testing machine manufactured by INSTRON CORPORATION®), and (b) inserting an identical joining assembly 200 in the same load frame but also in a compliant assembly 1, for example, as illustrated in FIG. 1. In both cases, the initial pressure imposed on the joining assembly 200 is varied. As shown in FIGS. 3a and 3b, the reactive joints formed in the compliant assembly 100 (shown as diamonds) have smaller thermal resistance and higher effective thermal conductivity than similar joints formed without the compliant assembly 100 (shown as squares), and this trend appears to hold regardless of the pressure initially applied on the assembly. The reduction in interface thermal resistance achieved in the compliant assembly 100 is advantageous, for example, in the reactive mounting of heat sinks as disclosed in Van Heerden. In particular, a lower interface thermal resistance may lead to lower operating temperatures in electronic chips, resulting in increased reliability of those chips, and/or enable higher clock speeds in chips, resulting in higher performance of those chips.

Figure 4:
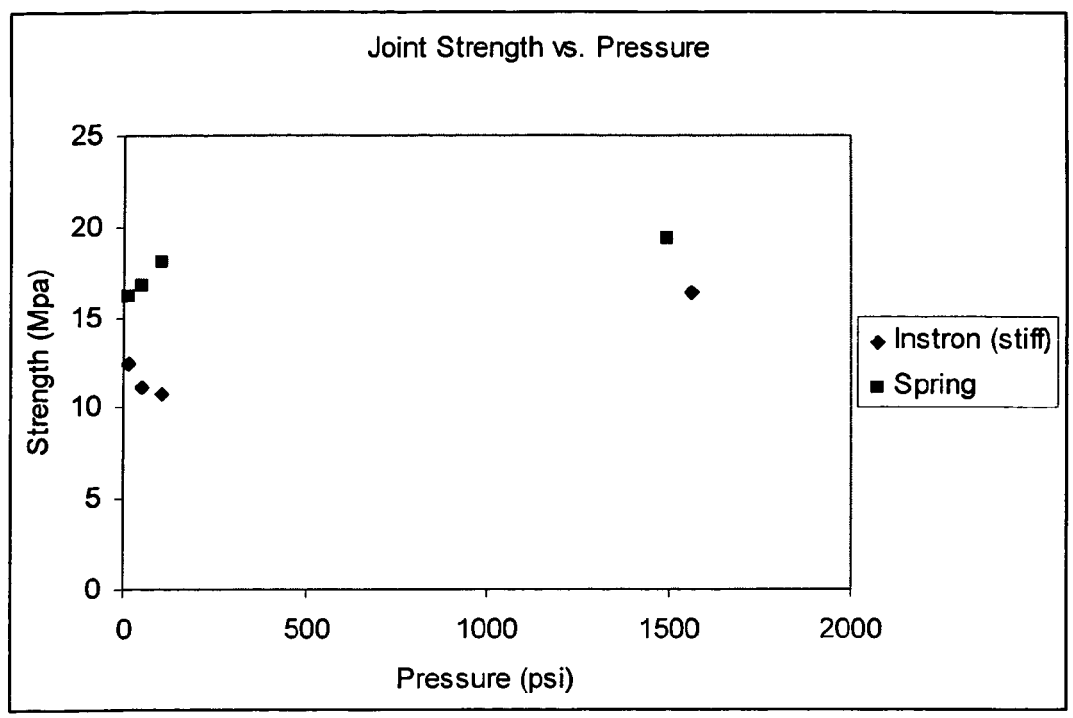
FIG. 4 depicts the results of the joining assembly of FIG. 2 joined using the compliant assembly of FIG. 1 as compared to an assembly without a compliant element according to a yet further embodiment of the invention.

In another embodiment of this invention, the advantages of forming reactive joints in a compliant system may be assessed by measuring the shear strength of the joints, and comparing the results with shear-strength measurements of similar joints formed in a non-compliant system. FIG. 4 shows the result of such a comparison for the joining assembly configuration shown in FIG. 2. The results indicate that the strengths of the joints obtained using the compliant assembly 100 (shown as diamonds) are systematically larger than those obtained using the load frame alone without a compliant element (shown as squares). Thus, similar to the trends based on thermal measurements, higher quality joints are obtained using the compliant assembly 100.

Figures 5A, 5B:
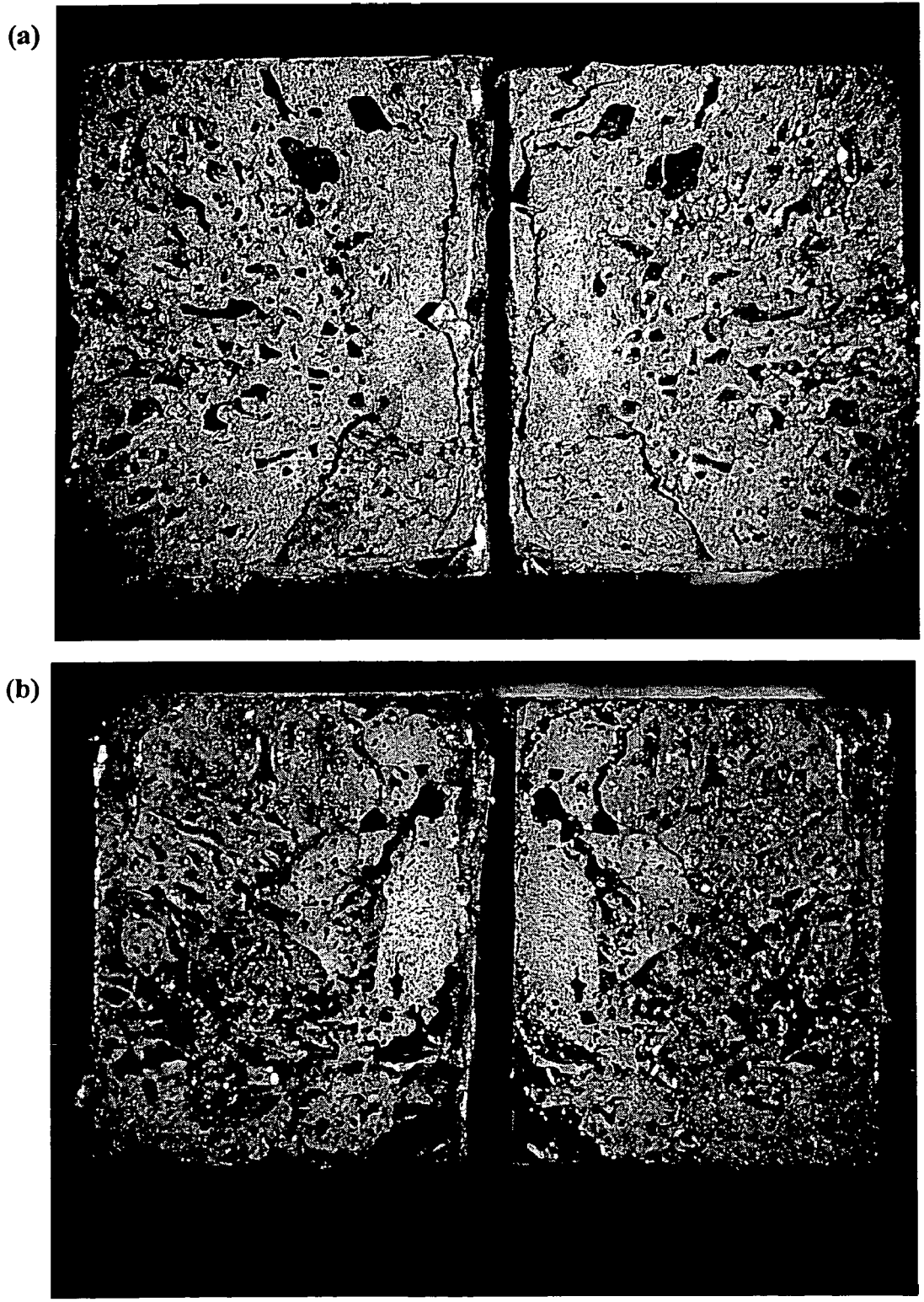
FIG. 5a depicts the joining assembly of FIG. 2 joined using the compliant assembly of FIG. 1 according to still another embodiment of the invention.
FIG. 5b depicts the joining assembly of FIG. 2 joined using assembly without a compliant element according to a still further embodiment of the invention.

In another embodiment of this invention, the advantages for forming reactive joints using a compliant assembly 100 are assessed using fractography on the joints following shear-lap testing. FIGS. 5a and 5b disclose fracture surfaces for two reactive joints: one fabricated using a compliant assembly 100 (FIG. 5a) and the second using only the stiff load frame (FIG. 5b). In both cases, the initial pressure applied on the joining assembly 100, 200 is about 100 psi. As shown in FIGS. 5a and 5b, the joint fabricated in the compliant assembly 100 has lower interfacial porosity (dark areas in the fracture surface) than a similar joint made in the stiff system. A lower porosity or void fraction is highly desirable, as it minimizes the likelihood of hot spots as well as the potential degradation of the joints on thermal cycling. These observations are consistent with earlier demonstration that joints obtained in the compliant system are of higher quality than those obtained in the stiff system.

In another embodiment of this invention, measurements of the properties of joints formed using one or more compliant elements may be assessed by systematically varying the stiffness of compliant elements. Advantages of using compliant elements in reactive joining processes (e.g., as disclosed herein) may be achieved if a stiffness of the compliant element is selected such that the pressure applied to the joining assembly during reactive joining process remains within about 20% of the pressure applied to the joining assembly prior to the initiation of the reactive joining process (e.g., prior to initiating the chemical transformation of the reactive multilayer foil). Accordingly, the pressure is between about 80% and about 120%.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
   providing at least two components to be joined, a reactive multilayer foil, and a compliant element;
   placing the reactive multilayer foil between the at least two components;
   applying pressure to the at least two components and the reactive multilayer foil via the compliant element;
   initiating a chemical transformation of the reactive multilayer foil so as to physically join the at least two components; and
   actively compressing and expanding the compliant element to maintain an applied pressure.

2. The method of claim 1, wherein the pressure applied to the at least two components and the reactive multilayer foil after initiating a chemical transformation of the reactive multilayer foil is between about 80% and about 120% of an initial pressure applied to the at least two components and the reactive multilayer foil prior to initiating the chemical transformation of the reactive multilayer foil.

3. The method of claim 1, wherein the compliant element is a spring.

4. The method of claim 1, wherein the compliant element is a plunger.

5. The method of claim 1, wherein the compliant element is a component of at least one of a pneumatic system, a hydraulic system, and a piezoelectric system.

6. The method of claim 1, wherein the compliant element is a deformable material.

7. The method of claim 6, wherein the deformable material is a deformable pad.

8. The method of claim 1, wherein the compliant element is a portion of an active feedback system.

9. The method of claim 8, wherein the active feedback system is at least one of a pneumatic system, a hydraulic system, and a piezoelectric system.

10. The method of claim 1, further comprising providing one or more fusible layers and arranging the one or more fusible layers between the reactive multilayer foil and the at least two components.

11. The method of claim 10, wherein at least one of the one or more fusible layer is at least one of solder or braze.

12. The method of claim 1, further comprising one or more adhesion layers coated on one or more surfaces of the reactive multilayer foil.

13. The method of claim 9, wherein at least one of the one or more adhesion layers includes Incusil.

14. A method, comprising:
   providing at least two components to be joined, a reactive multilayer foil, and a compliant element;
   placing the reactive multilayer foil between the at least two components;
   applying pressure to the at least two components and the reactive multilayer foil via the compliant element;
   initiating a chemical transformation of the reactive multilayer foil so as to physically join the at least two components; and
   varying an applied pressure by actively compressing and expanding the compliant element.

15. The method of claim 14, wherein the applied pressure is varied between about 80% and about 120% of an initial applied pressure.

* * * * *

UNITED STATES PATENT AND TRADEMARK OFFICE
CERTIFICATE OF CORRECTION

PATENT NO.         : 7,441,688 B2                                      Page 1 of 14
APPLICATION NO. : 10/976877
DATED              : October 28, 2008
INVENTOR(S)        : David Van Heerden It is certified that error appears in the above-identified patent and that said Letters Patent is hereby corrected as shown below:

The Title Page, showing an illustrative figure, should be deleted and substitute therefor the attached Title Page.

Delete drawings sheet 1-12 and substitute therefor the drawing sheets, consisting of figs. 1-12 as shown on the attached page.

In claim 13, column 10, line 35, "claim 9," should read --claim 12,--.

Signed and Sealed this

Third Day of March, 2009

JOHN DOLL
*Acting Director of the United States Patent and Trademark Office*

United States Patent
Van Heerden et al.

(10) Patent No.: US 7,441,688 B2
(45) Date of Patent: Oct. 28, 2008

(54) METHODS AND DEVICE FOR CONTROLLING PRESSURE IN REACTIVE MULTILAYER JOINING AND RESULTING PRODUCT

(75) Inventors: David Van Heerden, Baltimore, MD (US); Jesse Newson, Timonium, MD (US); Timothy Rude, Timonium, MD (US); Omar M. Knio, Timonium, MD (US); Timothy P. Weihs, Baltimore, MD (US)

(73) Assignee: Reactive Nanotechnologies, Hunt Valley, MD (US)

(*) Notice: Subject to any disclaimer, the term of this patent is extended or adjusted under 35 U.S.C. 154(b) by 193 days.

(21) Appl. No.: 10/976,877

(22) Filed: Nov. 1, 2004

(65) Prior Publication Data
US 2005/0121499 A1 Jun. 9, 2005

Related U.S. Application Data
(60) Provisional application No. 60/516,755, filed on Nov. 4, 2003.

(51) Int. Cl.
  B23K 31/02 (2006.01)
(52) U.S. Cl. .................. 228/102; 228/234.1; 228/246
(58) Field of Classification Search ............... 228/246
  See application file for complete search history.

(56) References Cited

U.S. PATENT DOCUMENTS

| 3,388,027 | A | 12/1964 | Saunders |
| 4,092,234 | A * | 5/1978 | Horst et al. ............ 204/297.05 |
| 4,687,795 | A | 8/1986 | Burns et al. |
| 4,713,826 | A | 12/1987 | MacNeil et al. |
| 5,038,996 | A | 8/1991 | Wilcox et al. |
| 5,175,410 | A | 12/1992 | Freedman et al. |
| 5,381,944 | A | 1/1995 | Makowiecki et al. |
| 5,477,091 | A | 12/1995 | Brendecke et al. |
| 5,538,795 | A | 7/1996 | Barbee, Jr. et al. |
| 5,547,715 | A | 8/1996 | Barbee, Jr. et al. |
| 5,956,576 | A | 9/1999 | Toy et al. |
| 6,216,937 | B1 * | 4/2001 | DeLaurentis et al. ........ 228/13 |
| 6,413,860 | B1 | 7/2002 | Kyle |

(Continued)

FOREIGN PATENT DOCUMENTS

EP 0 907 064 A2 4/1999

(Continued)

OTHER PUBLICATIONS

U.S. Appl. No. 10/959,502, Van Heerden et al.

(Continued)

*Primary Examiner*—Kiley Stoner
(74) *Attorney, Agent, or Firm*—Finnegan, Henderson, Farabow, Garrett, & Dunner, L.L.P.

(57) ABSTRACT

The invention includes a method of joining two components. The method includes providing at least two components to be joined, a reactive multilayer foil, and a compliant element, placing the reactive multilayer foil between the at least two components, applying pressure on the two components in contact with the reactive multilayer foil via a compliant element, and initiating a chemical transformation of the reactive multilayer foil so as to physically join the at least two components. The invention also includes two components joined using the aforementioned method.

15 Claims, 12 Drawing Sheets

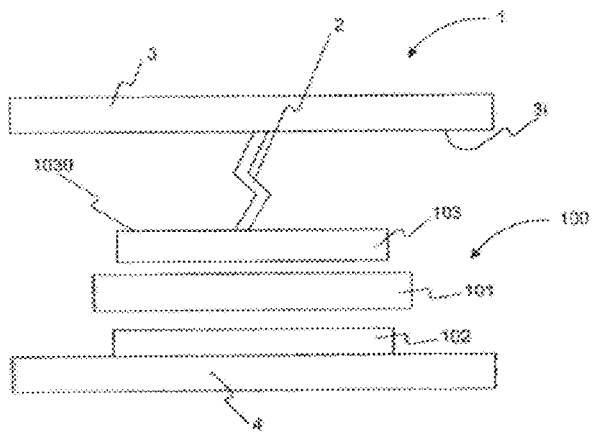

(a)

(b)